(12) United States Patent
Bran de León et al.

(10) Patent No.: US 8,086,084 B2
(45) Date of Patent: Dec. 27, 2011

(54) FIBER OPTIC SPLICE TRAY

(75) Inventors: Oscar Fernando Bran de León, Belle Plaine, MN (US); Ryan J. Owens, Hopkins, MN (US); Nicholas Torman, Farmington, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 282 days.

(21) Appl. No.: 12/555,623

(22) Filed: Sep. 8, 2009

(65) Prior Publication Data

US 2010/0061693 A1   Mar. 11, 2010

Related U.S. Application Data

(60) Provisional application No. 61/095,470, filed on Sep. 9, 2008.

(51) Int. Cl.
*G02B 6/00* (2006.01)
(52) U.S. Cl. ......... 385/135; 385/134; 385/136; 385/137
(58) Field of Classification Search .................. 385/134, 385/135, 136, 137
See application file for complete search history.

(56) References Cited

U.S. PATENT DOCUMENTS

| | | | |
|---|---|---|---|
| 4,687,289 A | 8/1987 | DeSanti | |
| 4,792,203 A | 12/1988 | Nelson et al. | |
| 4,840,449 A | 6/1989 | Ghandeharizadeh | |
| 4,911,521 A | 3/1990 | Ryuto et al. | |
| 5,323,478 A | 6/1994 | Milanowski et al. | |
| 5,323,480 A | 6/1994 | Mullaney et al. | |
| 5,572,617 A | 11/1996 | Bernhardt et al. | |
| 5,790,741 A | 8/1998 | Vincent et al. | |
| 5,956,449 A | 9/1999 | Otani et al. | |
| 6,269,213 B1 | 7/2001 | Ohta et al. | |
| 6,411,767 B1 | 6/2002 | Burrous et al. | |
| 6,418,266 B1 | 7/2002 | Vitantonio | |
| 6,424,782 B1 | 7/2002 | Ray | |
| 6,434,313 B1 | 8/2002 | Clapp, Jr. et al. | |
| 6,449,418 B1 | 9/2002 | Brocheton | |
| 6,496,640 B1 | 12/2002 | Harvey et al. | |
| 6,504,986 B1 | 1/2003 | Wambeke et al. | |
| 6,504,987 B1 | 1/2003 | Macken et al. | |

(Continued)

FOREIGN PATENT DOCUMENTS

FR    2 898 417 A1    9/2007

(Continued)

OTHER PUBLICATIONS

FOSC 400 Fiber Optic Splice Closures, *Tyco Electronics*, 8 pages (Copyright 2005, 2008).

(Continued)

*Primary Examiner* — Jennifer Doan
(74) *Attorney, Agent, or Firm* — Merchant & Gould P.C.

(57) ABSTRACT

A splice tray includes a splice region and a fiber management region to facilitate splicing together two or more fibers. A cover may be pivotally coupled to the splice tray. The splice tray may be pivotally coupled to a second splice trays by coupling the splice tray to the cover of the second splice tray using an attachment assembly to form a splice tray arrangement. An attachment assembly may include one or more protrusions on the cover of the first splice tray that fit within openings and/or channels defined in the second splice tray or vice versa.

17 Claims, 27 Drawing Sheets

U.S. PATENT DOCUMENTS

| | | | |
|---|---|---|---|
| 6,507,691 | B1 | 1/2003 | Hunsinger et al. |
| 6,621,975 | B2 | 9/2003 | Laporte et al. |
| 6,721,484 | B1 | 4/2004 | Blankenship et al. |
| 6,766,094 | B2 | 7/2004 | Smith et al. |
| 6,798,967 | B2 * | 9/2004 | Battey et al. ............ 385/135 |
| 6,944,389 | B2 | 9/2005 | Giraud et al. |
| 7,045,710 | B1 | 5/2006 | Allen et al. |
| 7,072,559 | B2 | 7/2006 | Giordano et al. |
| 7,200,316 | B2 | 4/2007 | Giraud et al. |
| 7,272,291 | B2 | 9/2007 | Bayazit et al. |
| 7,274,852 | B1 | 9/2007 | Smrha et al. |
| 7,310,471 | B2 | 12/2007 | Bayazit et al. |
| 7,340,145 | B2 | 3/2008 | Allen |
| 7,397,996 | B2 * | 7/2008 | Herzog et al. ............ 385/135 |
| 7,418,184 | B1 | 8/2008 | Gonzales et al. |
| 7,421,182 | B2 | 9/2008 | Bayazit et al. |
| 7,457,504 | B2 | 11/2008 | Smrha et al. |
| 2002/0191939 | A1 | 12/2002 | Daoud et al. |
| 2005/0249474 | A1 | 11/2005 | Tan |
| 2005/0249475 | A1 | 11/2005 | Womack et al. |
| 2006/0147173 | A1 | 7/2006 | Womack et al. |

FOREIGN PATENT DOCUMENTS

| | | |
|---|---|---|
| WO | WO 96/10203 | 4/1996 |
| WO | WO 97/22025 | 6/1997 |

OTHER PUBLICATIONS

*UCAO Inline Closure with Multi-Function Tray (MFT)*, Corning Cable Systems GmbH & Co. KG, Nov. 2005 (4 pages).

Photographs of an MFT disclosed in the above document from Corning Cable Systems, (5 pages) (subject matter of photographs admitted as prior art as of the Nov. 2005 priority date).

International Search Report and Written Opinion mailed Dec. 16, 2009.

\* cited by examiner

FIBER OPTIC SPLICE TRAY

CROSS REFERENCE TO RELATED APPLICATION

This application claims the benefit of U.S. Provisional Patent Application Ser. No. 61/095,470, filed Sep. 9, 2008, which application is hereby incorporated by reference in its entirety.

TECHNICAL FIELD

The present disclosure relates generally to telecommunications components. More particularly, the present disclosure relates to a splice tray arrangement for use in fiber optic telecommunications systems.

BACKGROUND

Passive optical networks are becoming prevalent in part because service providers want to deliver high band width communication capabilities to customers. Fiber optic telecommunications networks can include a fiber optic network including distribution cables for connecting a central office to a plurality of end subscribers. A distribution cable network often includes a main or trunk cable including a plurality of fibers, and a plurality of branch cables (e.g., drop cables) that are spliced to corresponding fibers of the trunk cable and that are routed to locations such as subscriber locations or drop terminals. Splice trays can be used to protect and manage the region of the distribution cable where the branch cable or cables are spliced to the trunk cable. It is desirable for fiber optic splice trays to be easy to use and to provide effective cable management.

SUMMARY

Certain aspects of the present disclosure relate to fiber optic splice tray arrangements having features such as cable management structures and tray attachment mechanisms designed to facilitate access to individual splice trays. Certain embodiments of fiber optic splice tray include pivotal covers to which additional splice tray can be mounted.

A variety of additional aspects will be set forth in the description that follows. The aspects can relate to individual features and to combinations of features. It is to be understood that both the foregoing general description and the following detailed description are exemplary and explanatory only and are not restrictive of the broad features upon which the embodiments disclosed herein are based.

DETAILED DESCRIPTION

Figure 1:
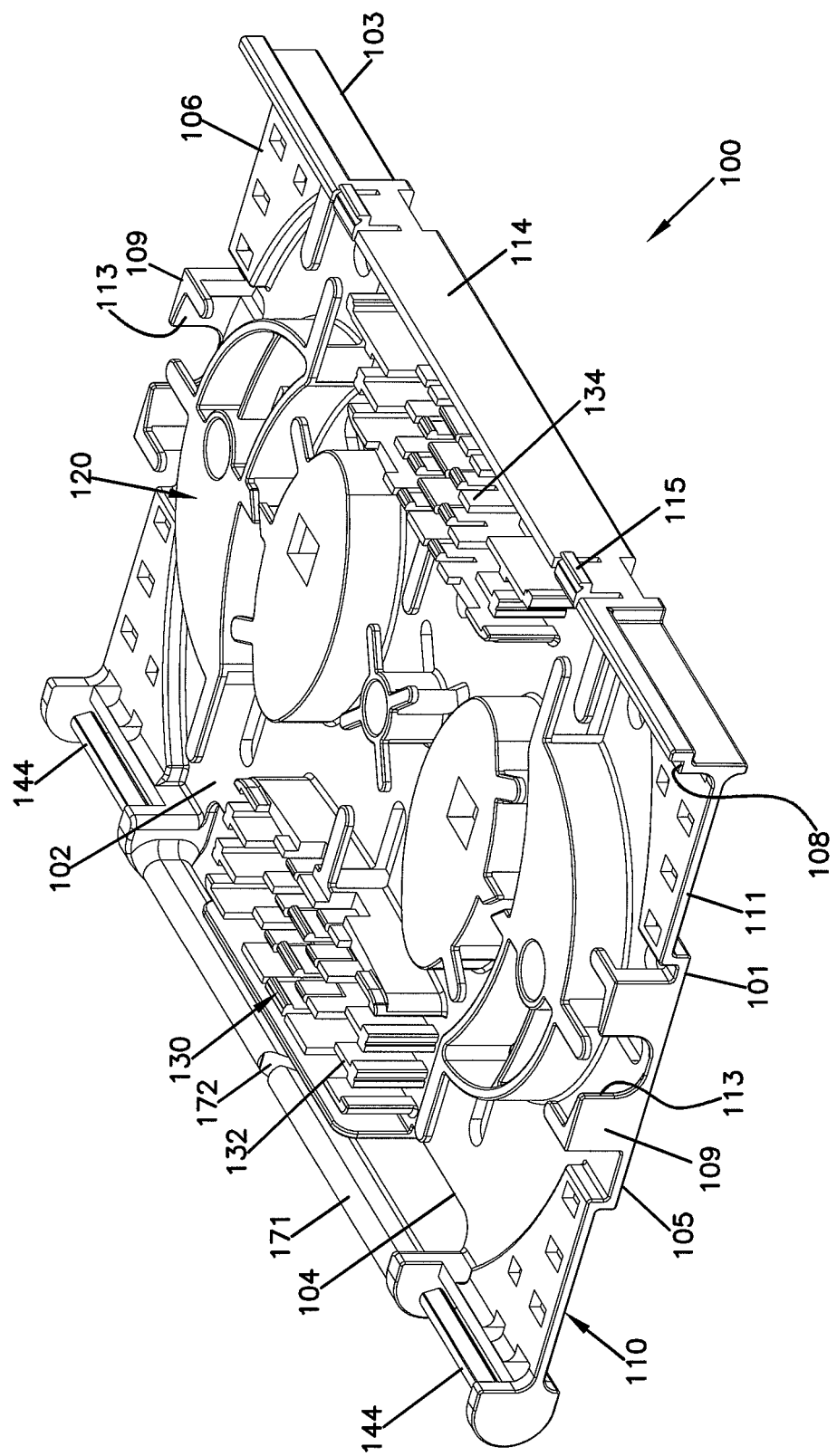
FIG. 1 is a top, front perspective view of a splice tray including first and second splice regions in accordance with the principles of the present disclosure.

FIGS. 1-5 show an example splice tray 100 including at least a first fiber input/output region 110, a fiber management region 120, and at least a first splice region 130. Fibers to be spliced may be routed onto the tray 100 at one of the fiber input/output regions 110. The fibers are optically spliced, protected within a splice cover (e.g., see splice cover 133 of FIG. 26), and secured to the tray 100 at one of the splice regions 130, 135. Excess length of the fiber can be routed through and stored in the fiber management region 120.

As shown in FIG. 1, the splice tray 100 includes a body 101 including a base panel 102 having opposite sides 103, 104 extending between opposite ends 105, 106. The base panel 102 has a first major surface (see FIG. 2) and a second, opposite major surface (see FIG. 3). In general, the fiber management region 120 is arranged in a central portion of the base panel 102 on the first major surface. In one embodiment, the splice tray 100 also includes a second splice region 135. In one such embodiment, the splice regions 130, 135 can be arranged on opposite sides of the fiber management region 120 (e.g., see FIG. 1).

In the example shown in FIGS. 1-5, four fiber input/output regions 110 are arranged at the outer corners of the body 101. In other embodiments, however, the splice tray 100 can include greater or fewer input/output regions 110. Each of the fiber input/output regions 110 of the tray body 101 protrudes upwardly from the base panel 102 into the interior of the tray body 101 to define a recess 111 beneath the base panel 102 (e.g., see FIG. 3). The recess 111 can provide clearance to accommodate a fiber securement arrangement (e.g., cable ties) 119 for coupling the fibers to the input/output region 110 (e.g., see FIG. 26).

In addition, each fiber input/output region 110 can define one or more openings 112 at which the fiber securement arrangement 119 can be coupled to the tray body 101. For example, in some embodiments, the securement arrangement 119 is secured to the base panel 102 by threading the securement arrangement 119 through openings 112 defined in the base panel 102 at the input/output regions 110. In one embodiment, the base panel 102 defines two rows of openings 112 at each input/output region 110.

In some embodiments, fibers also can be routed onto or off the splice tray body 101 through a pass-through opening 107 as will be discussed in greater detail herein. The pass-through opening 107 is an aperture defined between the second side 104 of the splice tray body 101 and a boundary surface 171. In the example shown, the pass-through opening 107 extends between the first splice region 130 and the second side 104 of the tray body 101 (e.g., see FIG. 2). In other embodiments, however, the pass-through opening 107 may be defined in the tray body 101 at any suitable position. Fibers can be threaded through the pass-through opening 107 or can be routed laterally through a slit 172 defined in the boundary surface 171.

Figure 4:
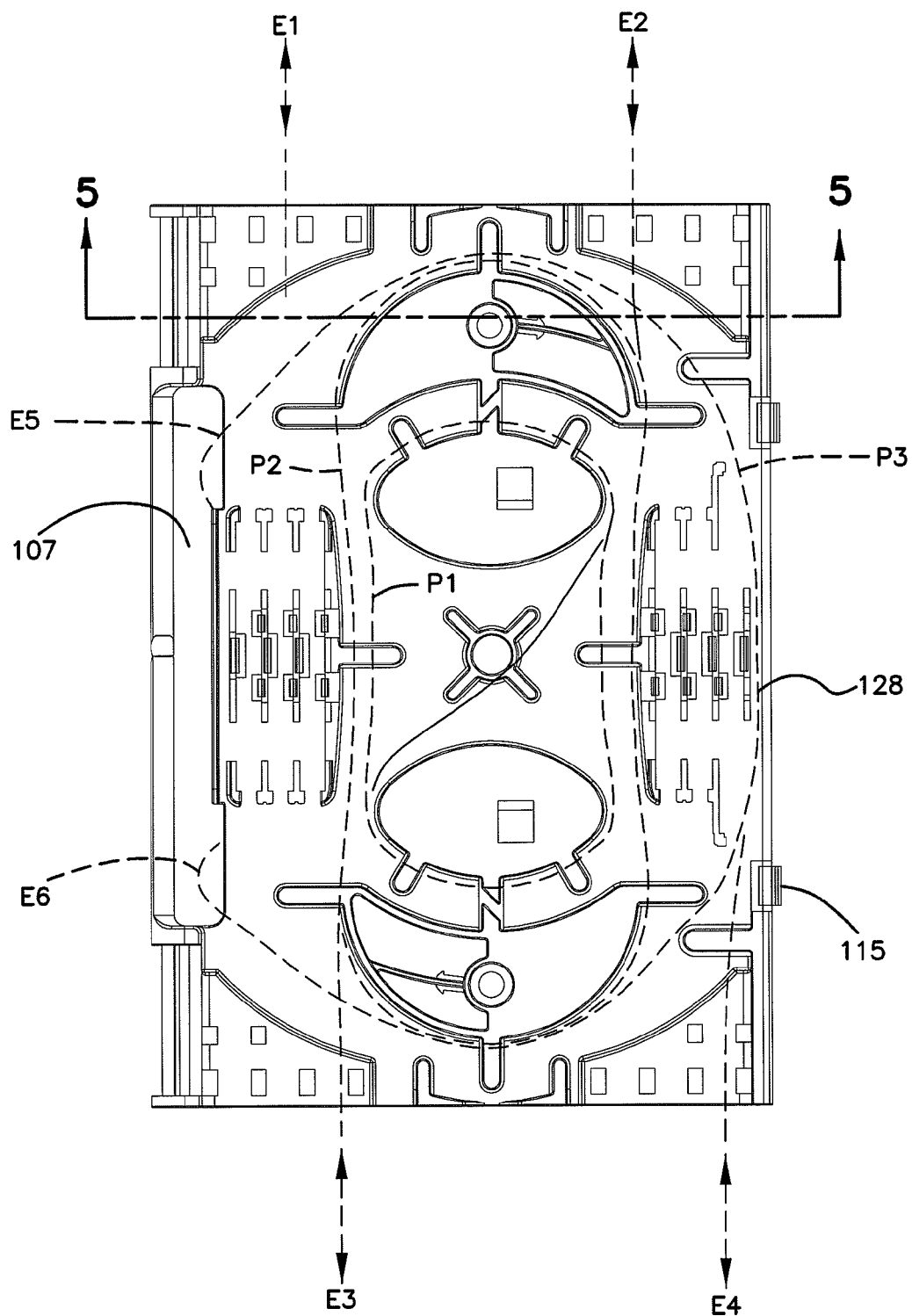
FIG. 4 is a plan view of the splice tray of FIG. 1 on which fiber routing paths are displayed in accordance with the principles of the present disclosure.
Figure 5:
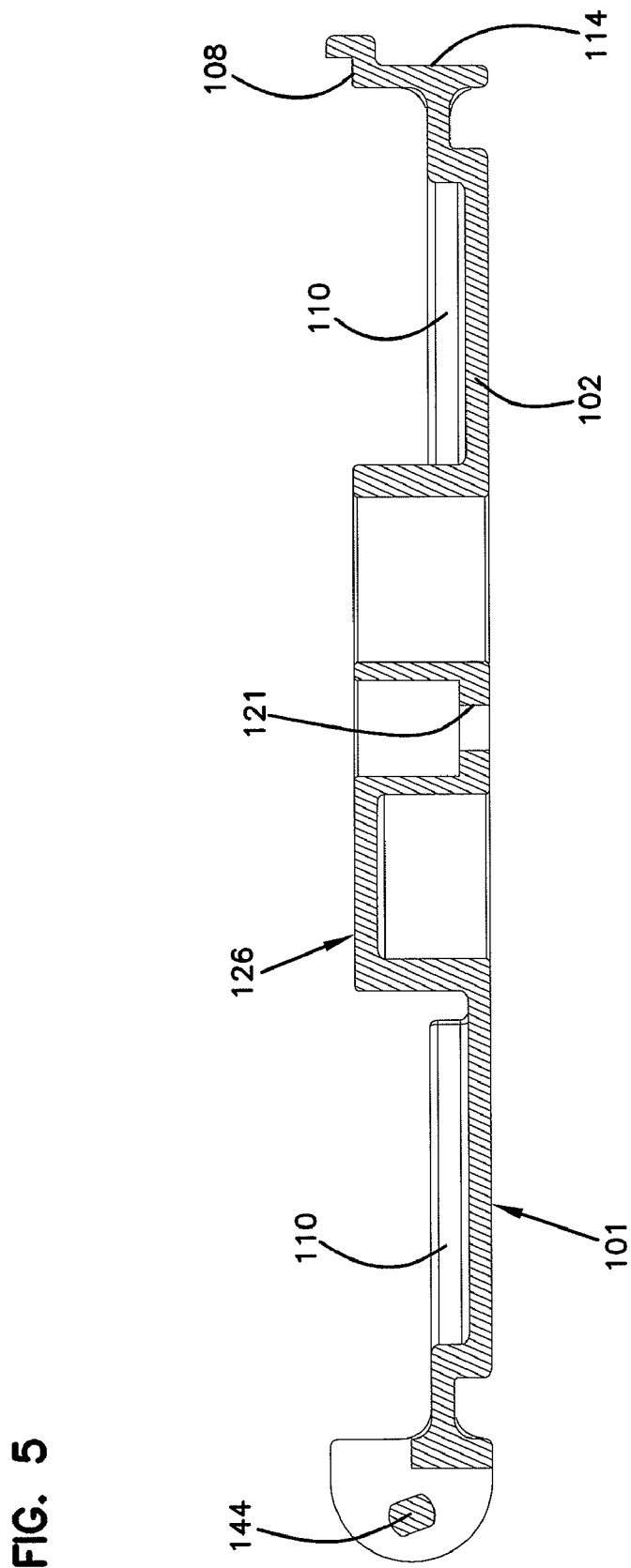
FIG. 5 is a cross-sectional view of the splice tray of FIG. 1 taken along the 5-5 line of FIG. 4 in accordance with the principles of the present disclosure.
Figure 6:
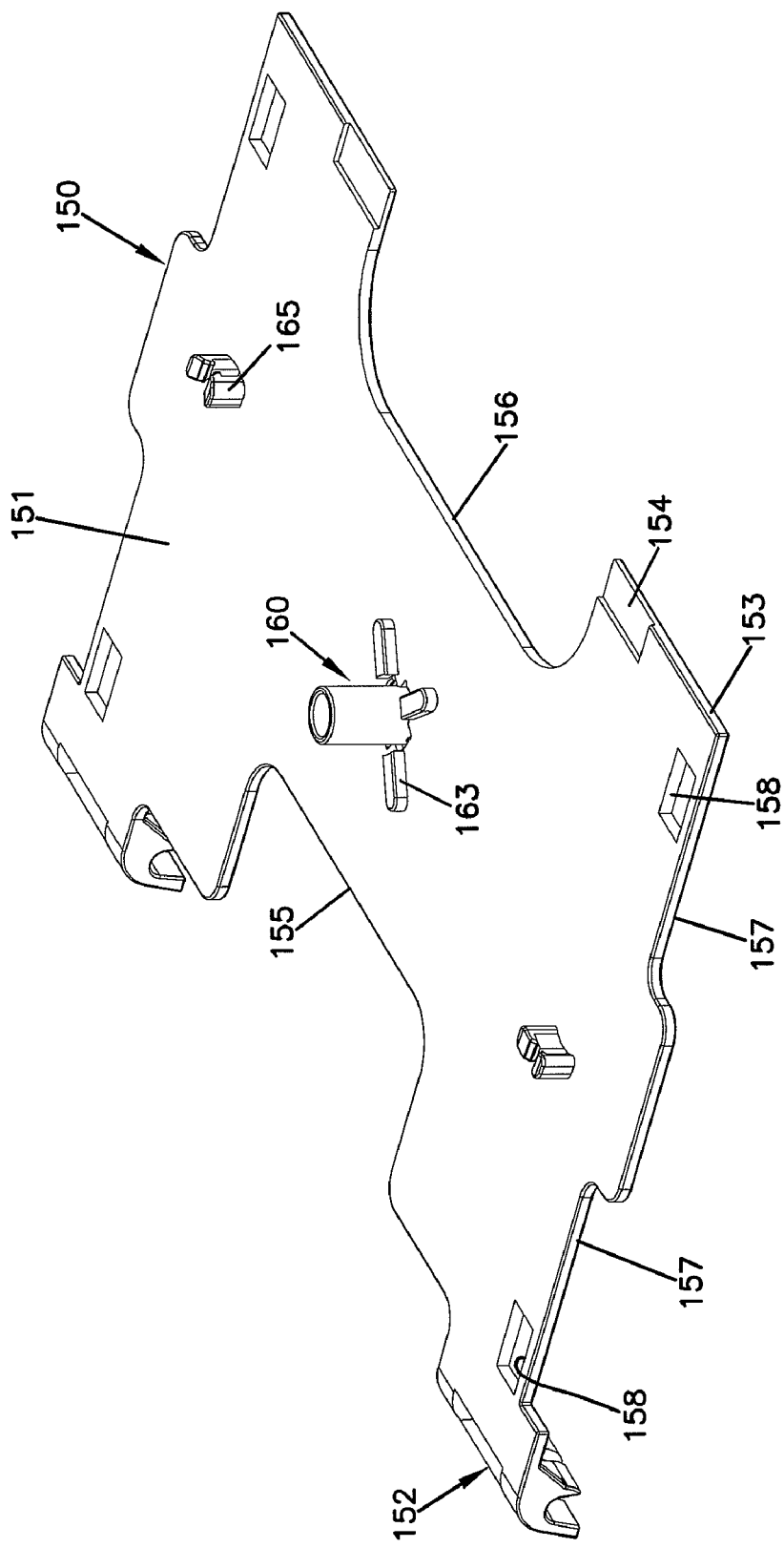
FIG. 6 is a top, front perspective view of a cover configured to pivotally mount to a splice tray, such as the splice tray of FIG. 1, in accordance with the principles of the present disclosure.

For example, FIG. 4 is a schematic diagram of fiber routing paths extending along the surface of the splice tray 100. The fibers may be routed on or off the splice tray 100 via any of input/output paths E1, E2, E3, and E4 extending through the input/output regions 110. In one embodiment, the fibers also can be routed onto or off the splice tray 100 via paths E5 and/or E6 extending through the pass-through opening 107. In other embodiments, the fibers may be routed onto or off the splice tray 100 via any suitable path.

Figure 8:
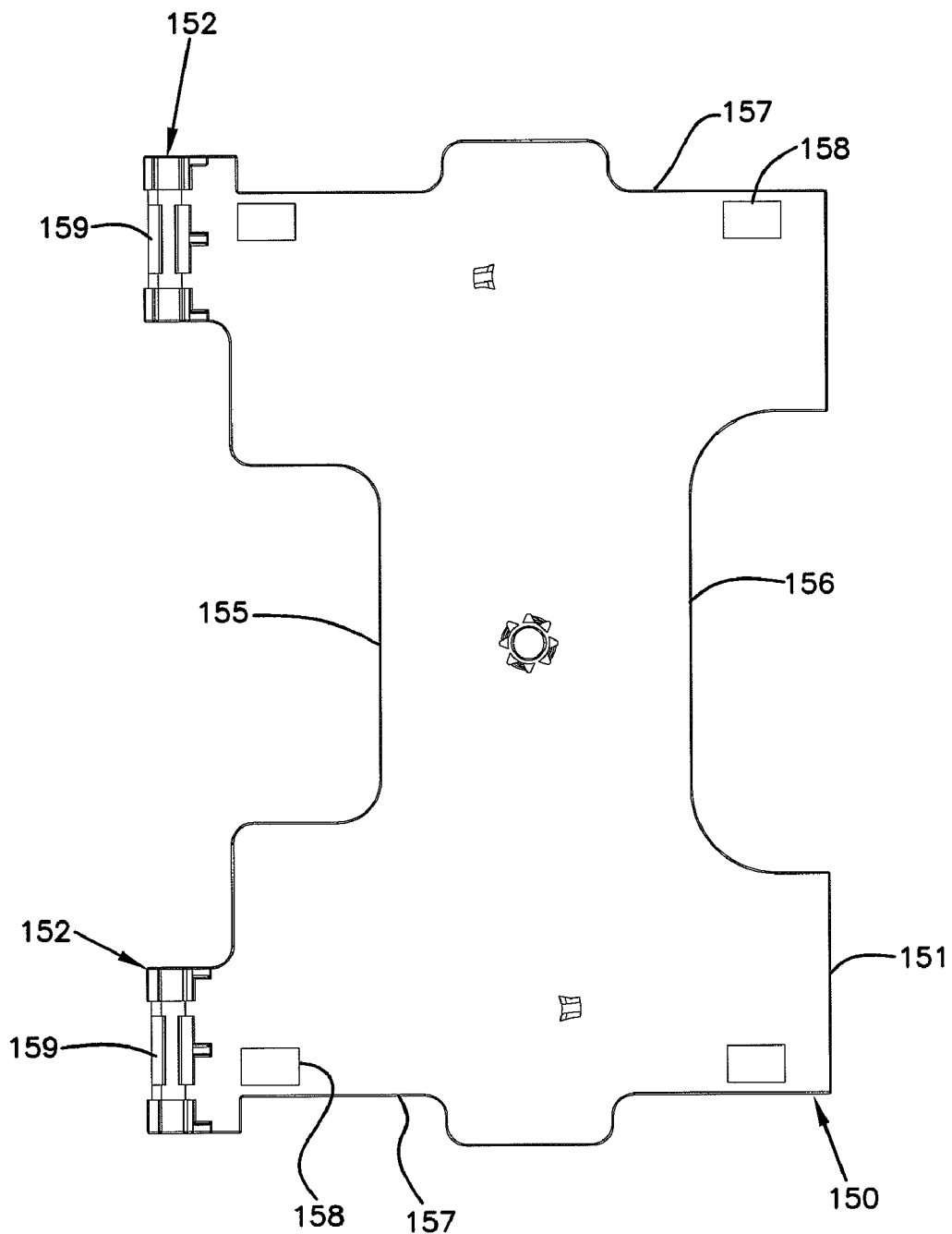
FIG. 8 is a bottom view of the cover of FIG. 6 in accordance with the principles of the present disclosure.
Figure 9:
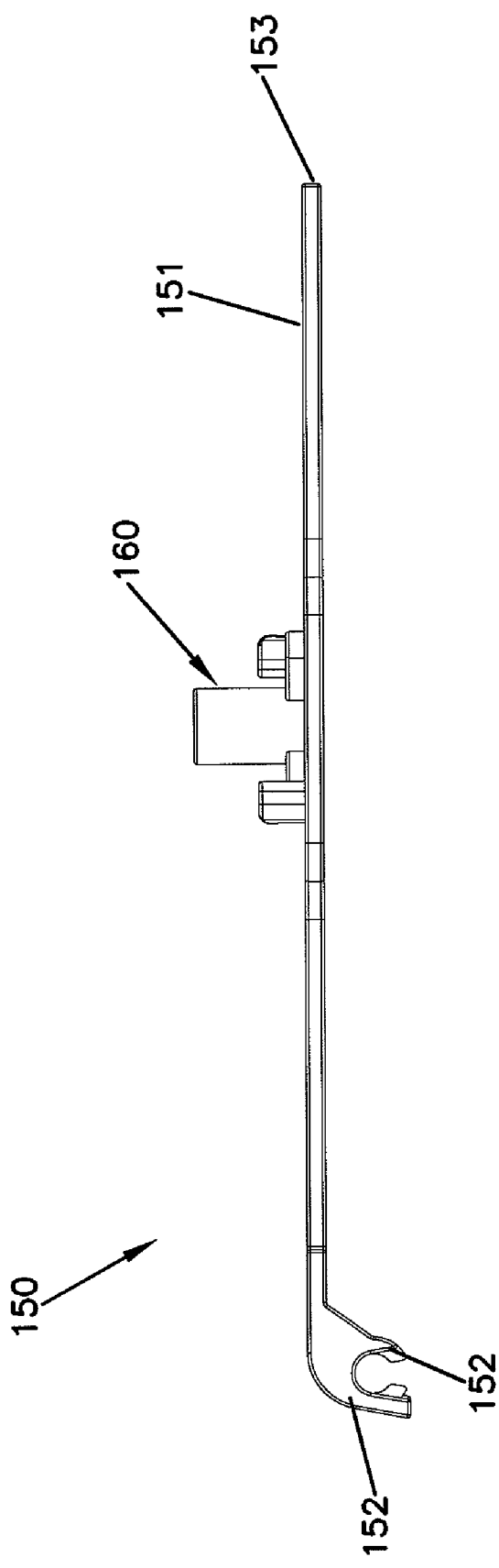
FIG. 9 is an elevational view of the cover of FIG. 6 in accordance with the principles of the present disclosure.

Once routed onto the tray 100, any excess fiber can be taken up and stored in the fiber management region 120. For example, excess fiber can be looped around a first fiber storage path P1 that extends around the interior perimeter of the tray body 101, a second fiber storage path P2 that extends around an intermediate perimeter of the tray body 101, a third fiber storage path P3 that extends around an exterior perimeter of the tray body 101, or a combination thereof. The fiber management region 120 also can facilitate reversing the direction of an incoming or outgoing fiber by enabling routing of the fiber in an S-shaped pattern (e.g., see FIG. 4), a figure-8 pattern, or any other suitable layout.

In general, the fiber management region 120 of the splice tray 100 includes one or more fiber management spools protruding upwardly from the base panel 102. In one embodiment, the fiber management region 120 includes a first fiber spool 122 arranged at a generally central location of the tray body 101, a pair of intermediate spools 124 arranged on opposite ends of the first fiber spool 122, and a pair of outer spools 126 arranged adjacent the opposite ends 105, 106 of the tray body 101 (e.g., see FIG. 2).

In the example shown in FIGS. 1-5, the first fiber spool 122 is relatively narrow in diameter in comparison with the other fiber spools 124, 126. The intermediate fiber spools 124 are full, oval-shaped fiber spools. The outer fiber spools 126 shown in FIG. 2 include fiber half-spools that have a larger curvature than the first and intermediate spools 122, 124. In other embodiments, however, the fiber management region 120 may include any suitable arrangement of fiber spools, bend radius limiters, and other fiber management structures. In one embodiment, each fiber management spool 122, 124, 126 includes one or more retention tabs 127 protruding outwardly from the spool (see FIG. 2).

In some embodiments, end walls 109 protrude upwardly from the base panel 102 at the ends 105, 106 of the body 101 of the splice tray 100. In one embodiment, the end walls 109 extend only partially between the sides 103, 104 of the splice tray body 101. For example, the end walls 109 shown in FIGS. 1-3 do not extend completely between the fiber input/output regions 110. In one embodiment, each end wall 109 defines a notch 113 configured to facilitate routing one or more optical fibers around the cable management half-spools 126. For example, the notch 113 defined in the end wall 109 can enable the fiber to leave the interior of the splice tray body 101 briefly (e.g., through the notch 113) to maneuver around the retention tab 127 protruding from the half-spool 126.

Inner sides 125 (FIG. 2) of the splice regions 130, 135 form a part of pathways P1 and P2 (FIG. 4) along which fibers (e.g., excess length of the fibers) can be routed. In one embodiment, fiber retention tabs 129 (FIG. 2) extend from the inner sides 125 to facilitate routing and retention of the fibers within the cable management region 120. In one embodiment, the splice regions 130, 135 also define outer channels 128 that form part of the exterior pathway P3 (FIG. 4) along which fibers may be routed.

In general, the splice regions 130, 135 include retaining structures 132, 134, respectively, that are configured to secure optical splice couplers (e.g., a splice sleeve 133 of FIG. 26) to the tray body 101. In the example shown in FIG. 2, the retaining structures 132, 134 of each splice region 130, 135 are configured to hold about three splice sleeves. In other embodiments, however, the retaining structures 132, 134 may be configured to hold any suitable number of splice sleeves.

In some embodiments, the base panel 102 may define one or more cavities 121 through which a fastener (e.g., screw, nail, bolt, etc.) may be inserted to fasten the splice tray 100 to a mounting surface (e.g., a wall, a panel, an enclosure, etc.). For example, one or more of the fiber management structures within the fiber management region 120 can define a cavity (e.g., see cavities 121 of FIGS. 2 and 3) extending through the base panel 102. In one embodiment, a fastener may be inserted through the cavity 121 defined in the central spool 122 to secure the tray body 101 to a surface. In another embodiment, one or more retention structures protruding from a mounting surface may be inserted through one or more of the cavities 121 to secure the splice tray 100 to the mounting surface. For example, retention tabs may be snap-fit to shoulders 123 (FIG. 2) arranged within cavities 121 defined in the full cable spools 124.

The splice tray body 101 can be configured to receive a cover (e.g., cover 150 of FIGS. 6-12) for enabling and inhibiting access to the interior of the splice tray 100. For example, the cover 150 can pivotally mount to the tray body 101. Such a cover 150 can be pivoted between a closed position (see FIG. 13) in which the cover 150 extends over the tray body 101 to an open position (see FIG. 14) in which the cover 150 allows access to the interior of the tray body 101.

Figure 2:
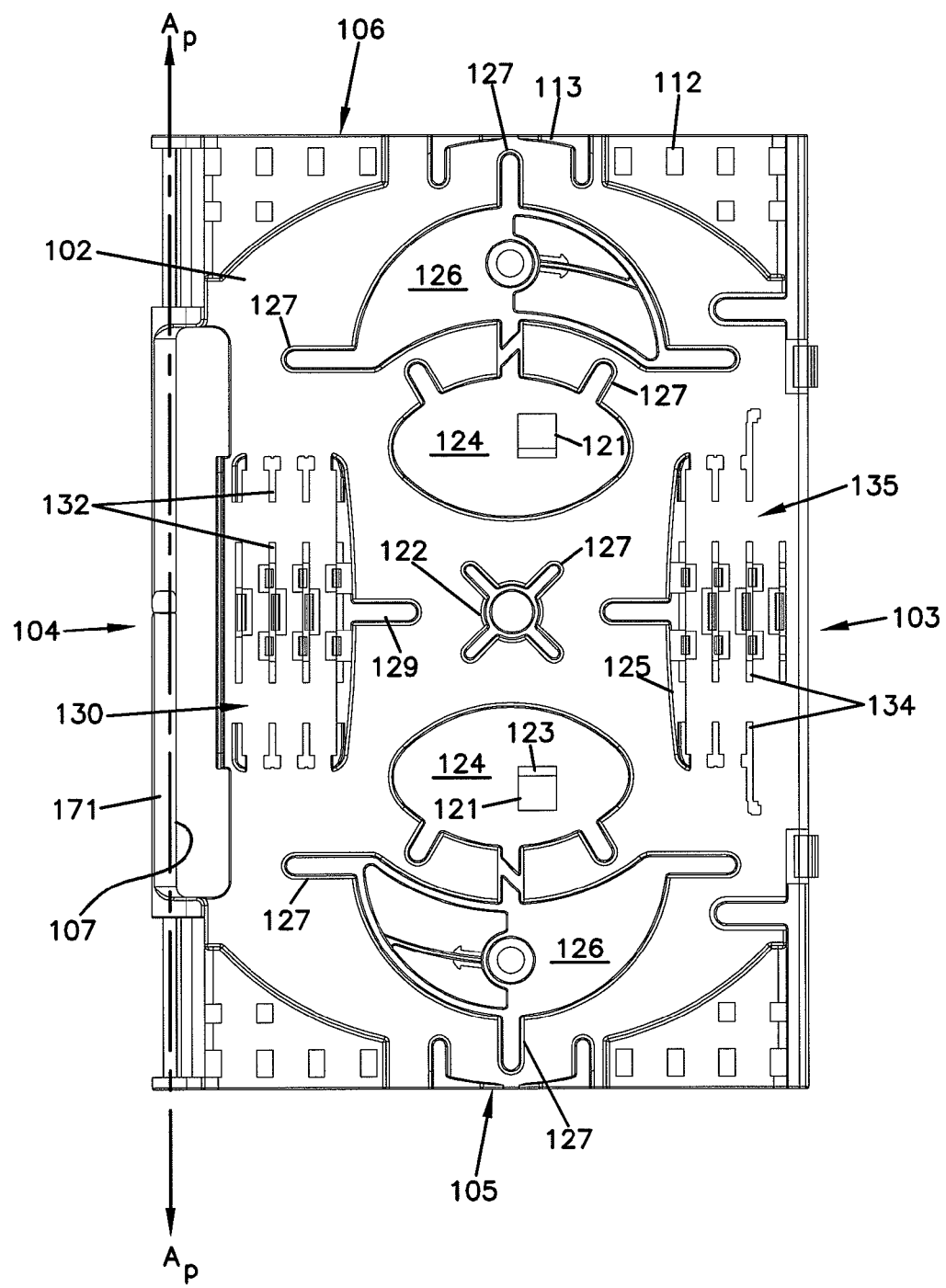
FIG. 2 is a plan view of the splice tray of FIG. 1 in accordance with the principles of the present disclosure.
Figure 3:
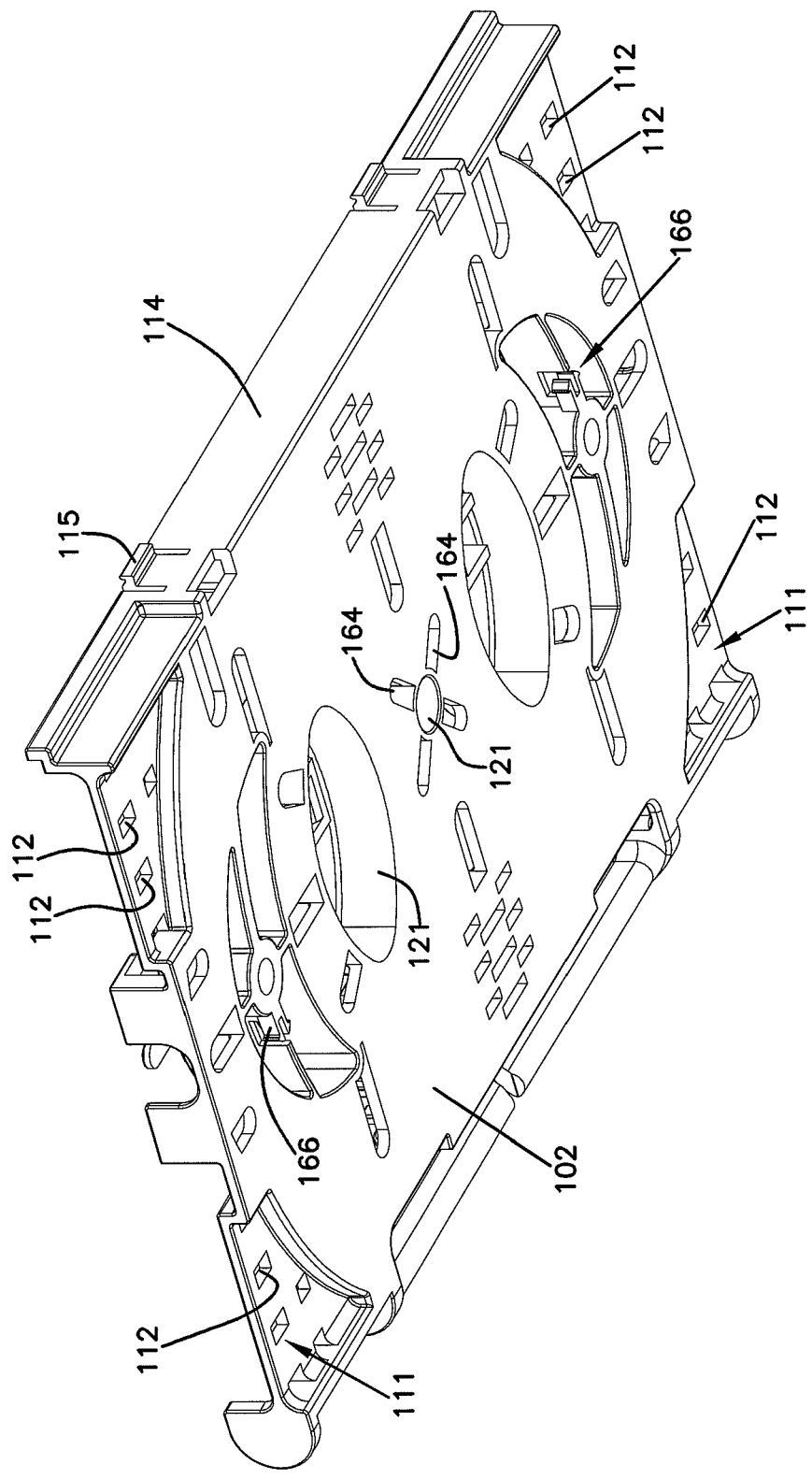
FIG. 3 is a bottom, front perspective view of the splice tray of FIG. 1 in accordance with the principles of the present disclosure.

In one embodiment, the splice tray body 101 includes at least a first hinge pin 144 (see FIG. 5) extending along the second side 104 of the tray body 101 and defining a hinge axis $A_P$ (FIG. 2). The cover 150 can pivotally mount to the hinge pin 144. In the example shown in FIG. 1, the splice tray 100 includes an outer pair of hinge pins 144 arranged at either end of the second side 104 of the tray body 101. In other embodiments, however, the splice tray 100 may include any suitable number of hinge pins 144. In one embodiment, each hinge pin 144 has two planar sides and two rounded sides (e.g., see FIG. 5). In another embodiment, each hinge pin 144 is generally cylindrical. In other embodiments, however, each hinge pin 144 may have any suitable shape allowing pivotal movement of a cover 150 about the hinge pin 144.

In the example shown in FIGS. 6-12, the cover 150 has at least one mounting receptacle 152 (e.g., see FIG. 12) that pivotally couples the cover 150 to the outer hinge pins 144 of the splice tray 100. In the example shown, the cover 150 includes mounting receptacles arranged at opposite ends of one side of the cover 150. In other embodiments, however, the cover 150 may include greater or fewer mounting receptacles in any suitable configuration. In one embodiment, the mounting receptacles 152 include fingers 159 that snap-fit over the hinge pins 144 (e.g., see FIGS. 20 and 21). In other embodiments, however, the mounting receptacles 152 are otherwise configured to couple to the hinge pins 144 of the splice tray 100.

In some embodiments, the cover 150 is removably mounted to the tray body 101. In the example shown, the cover 150 is mounted to the tray body 101 by orienting the mounting receptacle 152 to enable the fingers 159 of the mounting receptacle 152 to cam around one of the rounded sides of the hinge pin 144, slide along the flat sides of the hinge pin 144, and snap around the other rounded side of the hinge pin 144. For example, such an orientation is shown between the hinge pin 144 and mounting receptacle 152 in FIG. 21. The cover 150 can be removed from the body by returning the cover 150 to this orientation and pulling the cover 150 to slide the fingers 159 off the hinge pin 144.

Figure 13:
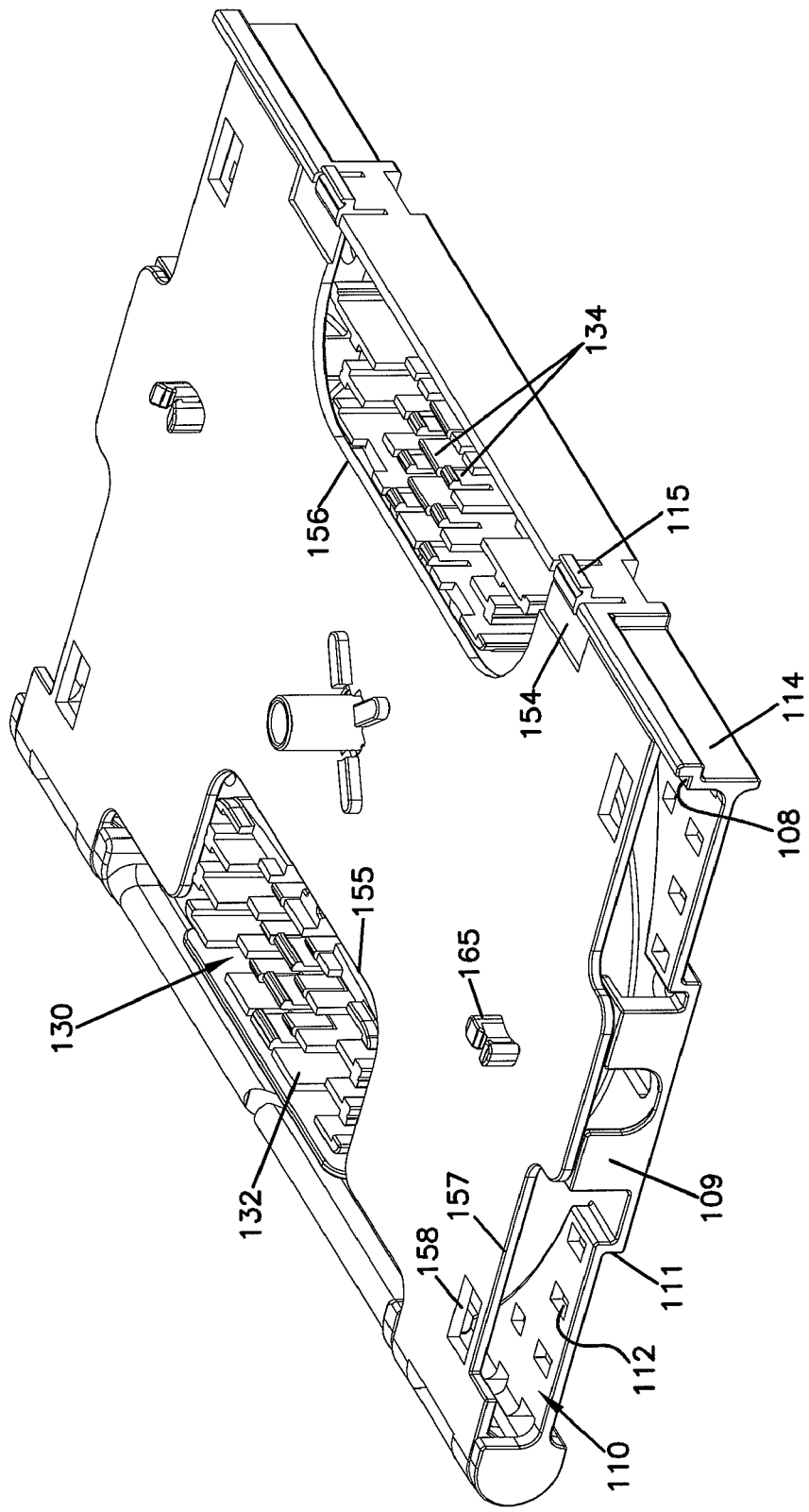
FIG. 13 is a top, front perspective view of a splice tray having a cover arranged in a closed position and secured by a latching mechanism in accordance with the principles of the present disclosure.

A side wall 114 extending along the first side 103 of the tray body 101 defines a shoulder 108 to accommodate a free end 153 of the cover 150 when the cover 150 is arranged in the closed position (e.g., see FIG. 13). Ends of the cover 150 also can seat on the end walls 109 of the tray body 101. In one embodiment, a body 151 of the cover 150 may seat on one or more of the fiber management structures arranged in the fiber management region 120. The end walls 109 and the cable spools 122, 124, 126 of the cable management region 120 typically do not protrude upwardly as far as the side wall 114 (e.g., see FIG. 5). Accordingly, the outer surface of the cover 150 is generally flush with the top of the side wall 114 of the splice tray 100 (e.g., see FIG. 20).

The side wall 114 of the splice tray body 101 also includes at least one flexible latch 115 that is configured to engage the cover 150 and secure the cover 150 in the closed position (see FIG. 13). For example, the side edge 153 of the cover 150 may define a recessed section 154 over which the latch 115 may extend when securing the cover 150 in the closed position. In one embodiment, the portion of the latch 115 extending over the recessed section 154 is sufficiently thin and the recessed section 154 is sufficiently deep that the top of the latch 115 is flush with the outer surface of the cover 150. In the example shown, the splice tray 100 includes first and second flexible latches 115 spaced along the side wall 114 and configured to latch to recesses 154 spaced along the side edge 153 of the cover 150.

Figure 15:
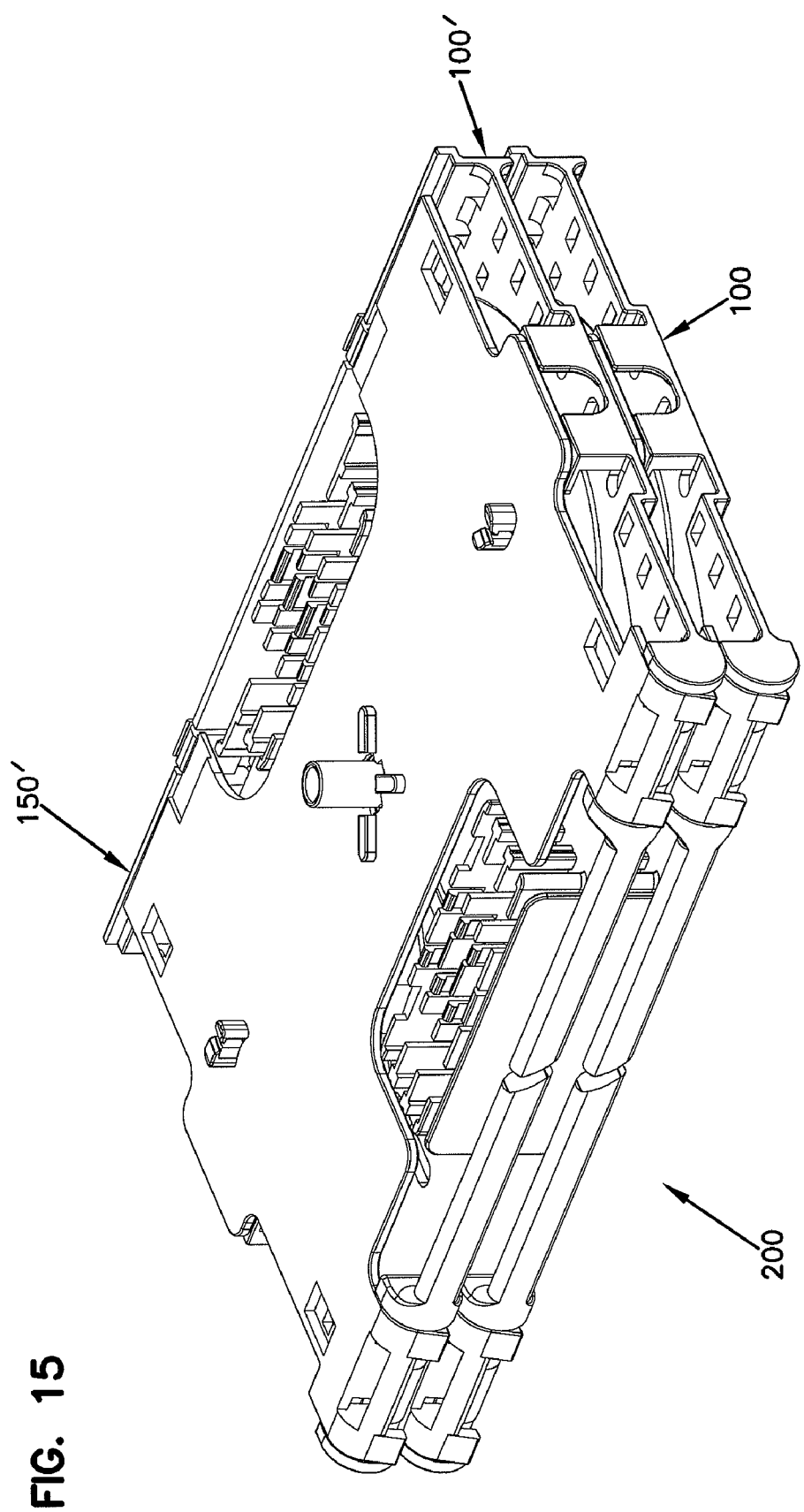
FIG. 15 is a top, rear perspective view of a tray assembly including a first splice tray coupled to a second splice tray, the tray assembly being configured in accordance with the principles of the present disclosure.
Figure 16:
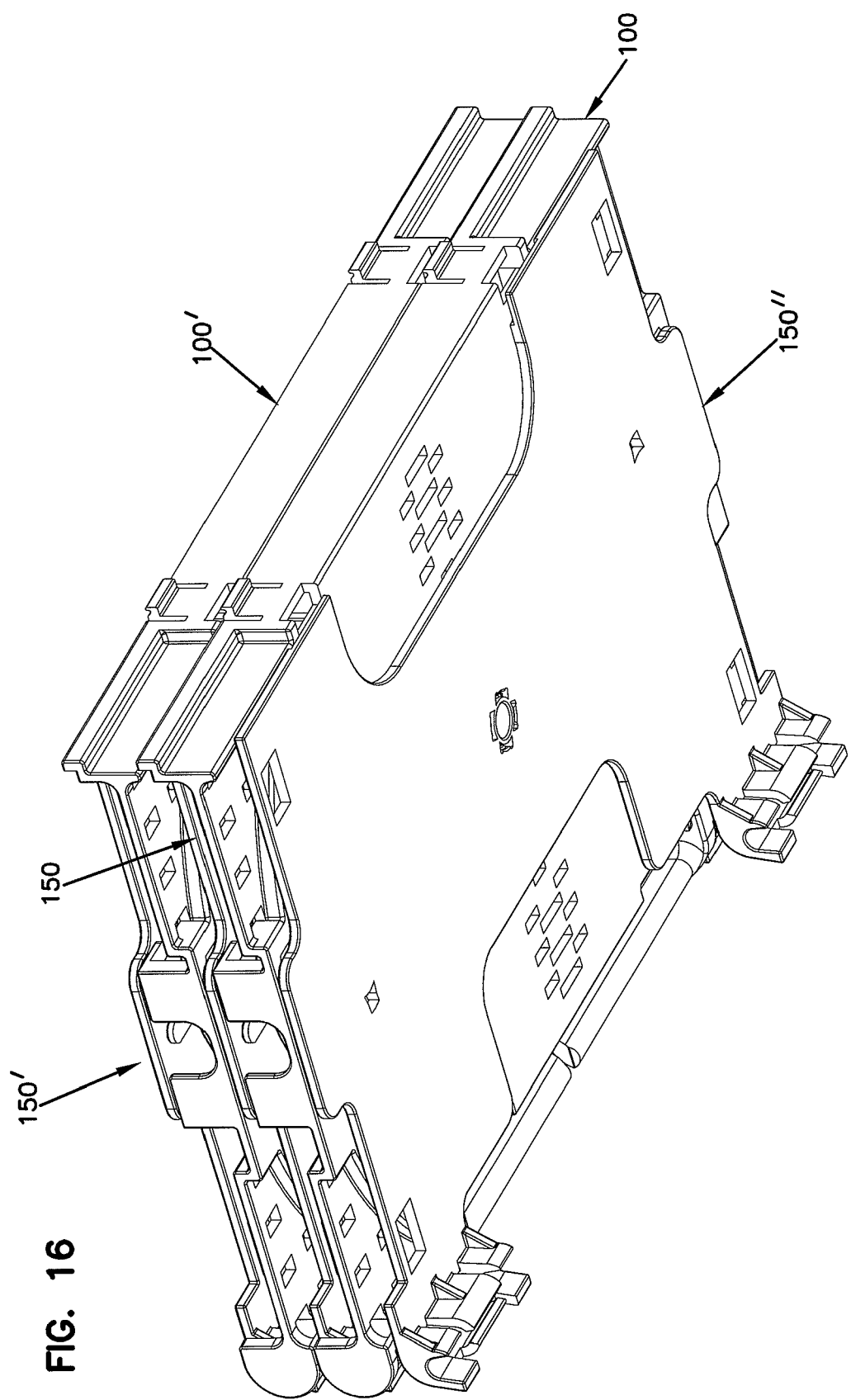
FIG. 16 is a bottom, front perspective view of the tray assembly of FIG. 15 configured in accordance with the principles of the present disclosure.
Figure 18:
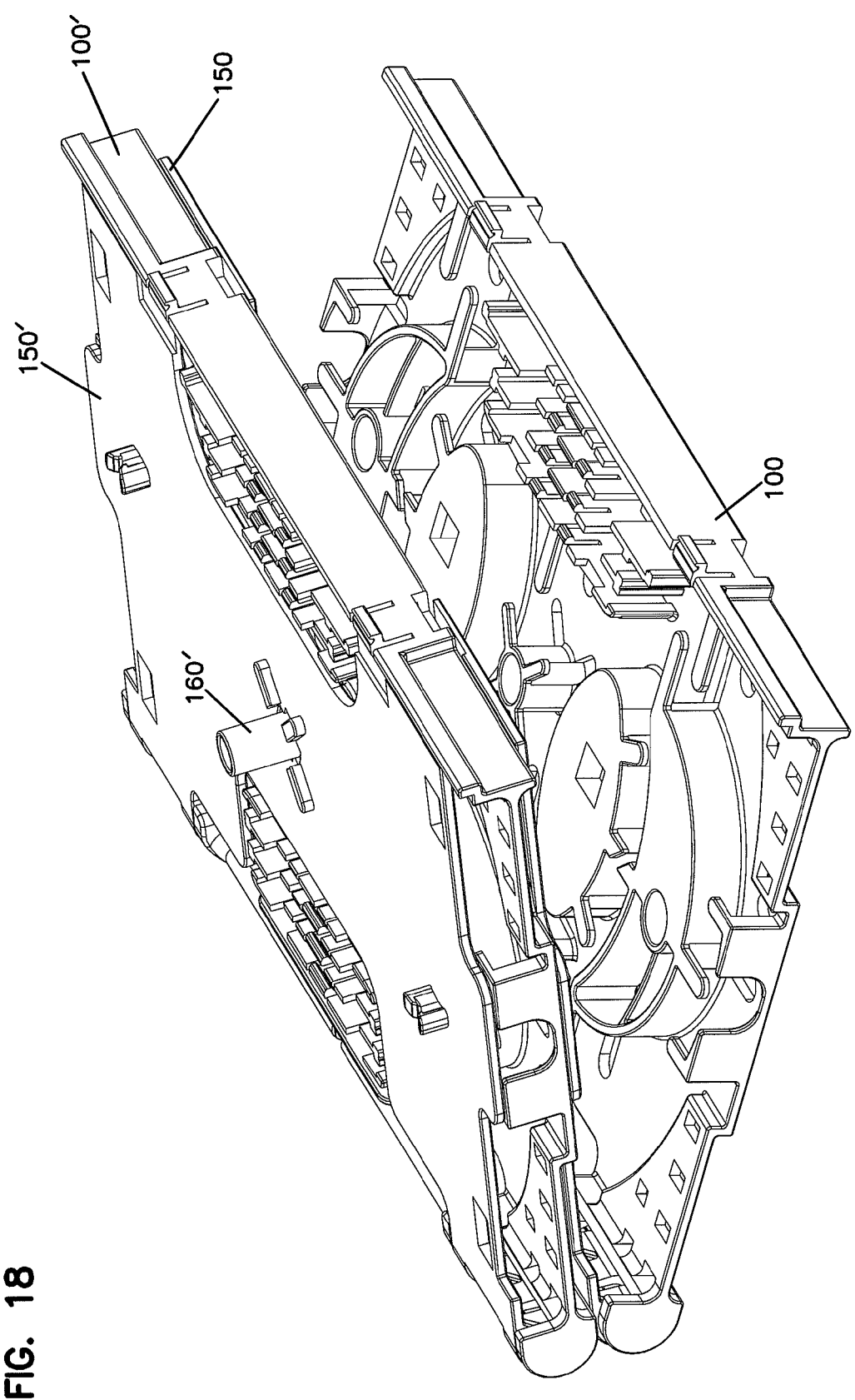
FIG. 18 is a top, front perspective view of the tray assembly of FIG. 15, the top tray being pivoted away from the bottom tray in accordance with the principles of the present disclosure.
Figure 19:
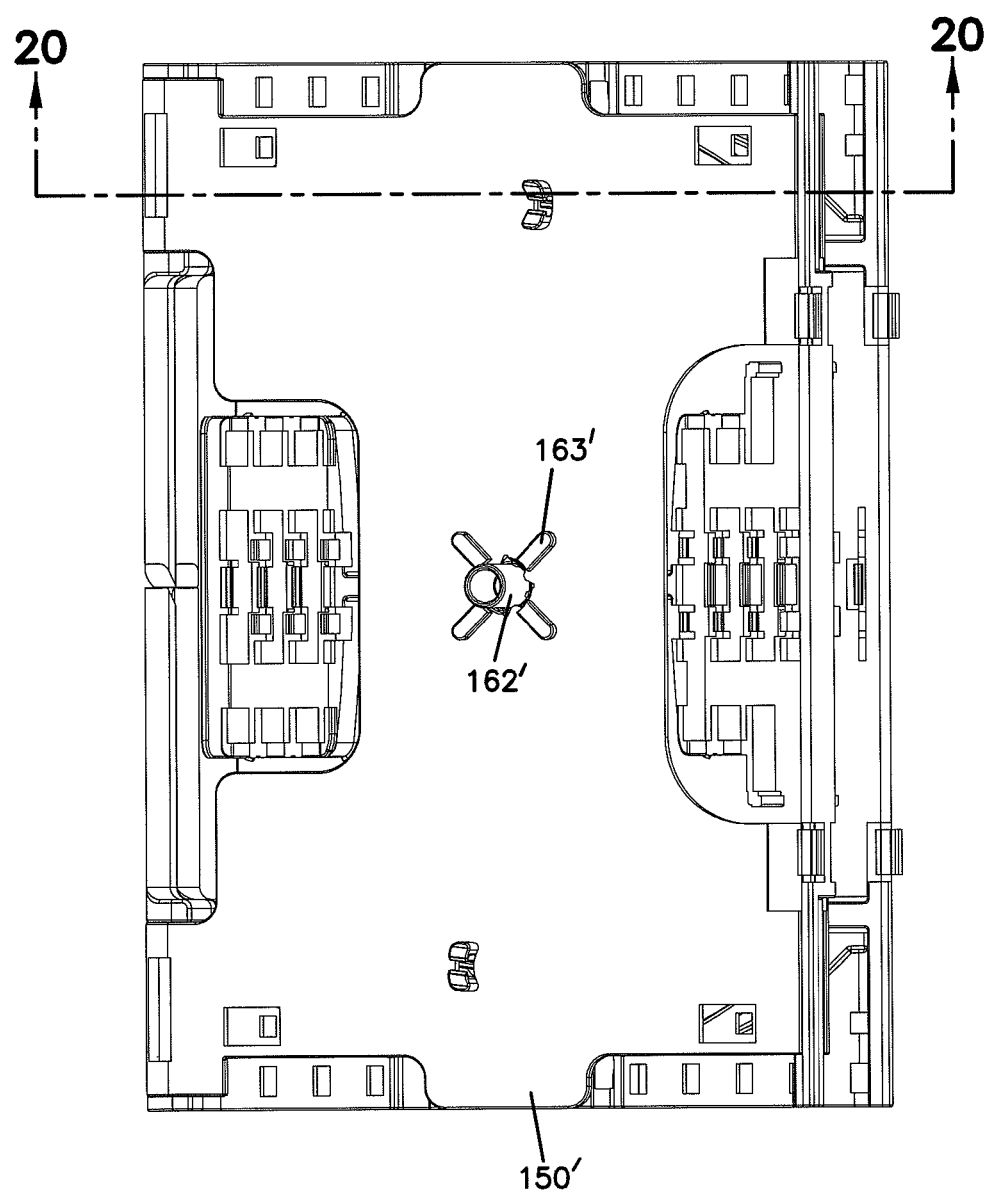
FIG. 19 is a plan view of the tray assembly of FIG. 15 in accordance with the principles of the present disclosure.

The cover 150 also can define a cut-out portion 155 to accommodate the retaining structure 132 of the splice region 130. In embodiments in which the splice tray 100 includes a second splice region 135, the cover 150 can define a second cut-out portion 156 to accommodate the retaining structure 134 of the second splice region 135 (see FIG. 13). In one embodiment, the tops of the retaining structures 132, 134 of the splice regions 130, 135 extend through the cut-out portions 155, 156 of the cover 150 and stop approximately flush with the top of the side wall 114 (see FIGS. 15 and 18).

The cover 150 also may include a cut-out portion 157 adjacent one or more of the fiber input/output regions 110. For example, in one embodiment, the cut-out portion 157 may align with one or more of the openings 112 defined in the base panel 102 at the input/output region 110. The cut-out portion 157 can accommodate one or more securement arrangements (e.g., cable ties) arranged at the fiber input/output region 110, thereby allowing the cover 150 to seat flush with the side wall 114 of the splice tray 100. In one embodiment, the cover 150 may include a cut-out portion 157 at each of multiple fiber input/output regions 110. In the example shown in FIG. 13, the cover 150 includes four cut-out portions 157 positioned over the four input/output regions 110 arranged generally at the corners of the splice tray 100.

In one embodiment, the cover 150 also may define an opening 158 extending through the cover 150 adjacent the cut-out portion 157. In one embodiment, the opening 158 aligns with one of the openings 112 defined in the base panel 102 adjacent an input/output region 110. The opening 158 also can facilitate attachment of the securement arrangement 119 to the splice tray 100. For example, the opening 158 may provide clearance to accommodate a head of a cable tie or other securement arrangement. Providing the clearance enables the cover 150 to seat flush with the top of the splice tray 100. In the example shown, the cover 150 defines an opening 158 adjacent each of the cut-out portions 157.

Figure 14:
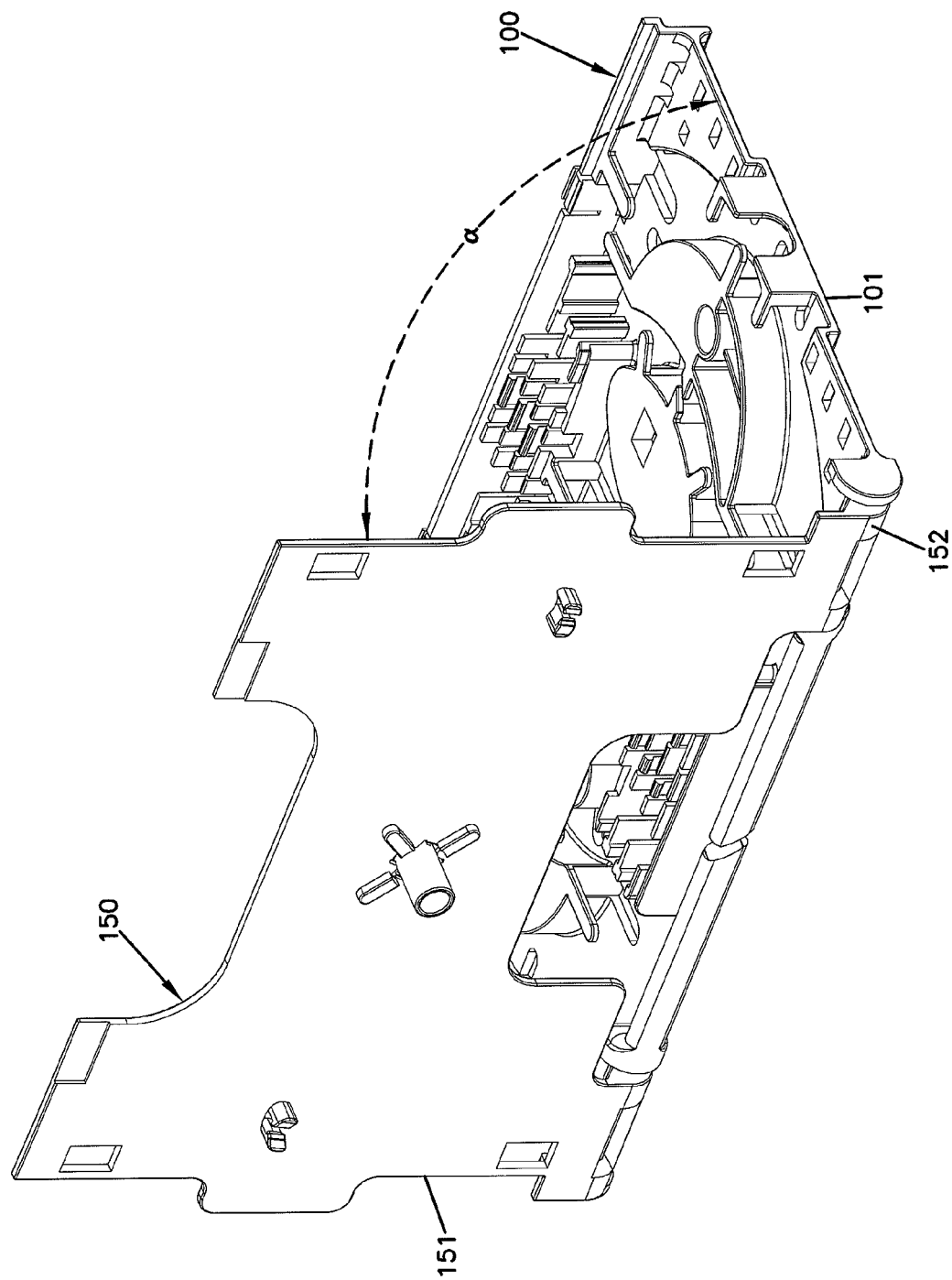
FIG. 14 is a top, rear perspective view of the splice tray of FIG. 13 with the cover arranged in an open position in accordance with the principles of the present disclosure.

When configured in the open position, the cover 150 may be arranged at a predetermined angle $\alpha$ relative to the base panel 102 (see FIG. 14). In some embodiments, the predetermined angle $\alpha$ between the open cover 150 and the base panel 102 may range from about 40° to about 180°. In one embodiment, the predetermined angle $\alpha$ between the open cover 150 and the splice tray 100 may range from about 80° to about 120°. In the example shown in FIG. 14, the predetermined angle $\alpha$ is about 90°.

Referring to FIGS. 15-25, the splice tray 100 can be coupled to one or more additional trays to form a tray arrangement 200. In one embodiment, the additional trays can include a splitter tray (not shown) containing an optical splitter configured to split an optical signal into multiple optical signals. In another embodiment, the splice tray 100 can be coupled to a fiber management and/or storage tray on which additional excess fiber length may be stored. In still other embodiments, the splice tray 100 can be coupled to one or more additional splice trays 100'. Common reference numbers will be used to indicate common features within the splice trays 100, 100'. For ease in understanding, however, the additional splice trays 100' in each tray assembly 200 and any features corresponding to the additional splice trays 100' will be designated with an apostrophe (i.e., a "prime") following the reference number for the remainder of this disclosure.

Fibers can be routed amongst the coupled trays of the tray arrangement 200. In one embodiment, fibers can be routed between the splice tray 100 and a splitter arranged on a splitter tray (not shown) of the stacked assembly 200. In another embodiment, the fibers can be routed between the splice tray 100 and cable management and/or storage structures arranged on one or more storage trays (not shown). In yet another embodiment, the fibers can be routed between one or more of the splice trays 100, 100'.

In one embodiment, fibers may be routed through the input/output regions 110, 110' of the splice trays 100, 100'. In another embodiment, the fibers may be routed via the pass-through openings 107, 107' defined in the bottom panel 102, 102' of each splice tray. The pass-through opening 107 facilitates routing fibers into the tray bodies 101, 101' from above or beneath the tray bodies 101, 101'. As noted above, fibers may be routed laterally through a slit 172, 172' defined in the boundary surface 171, 171' of each splice tray 100, 100' instead of threading the fibers through each pass-through opening 107, 107' in the splice tray arrangement 200.

Figure 17:
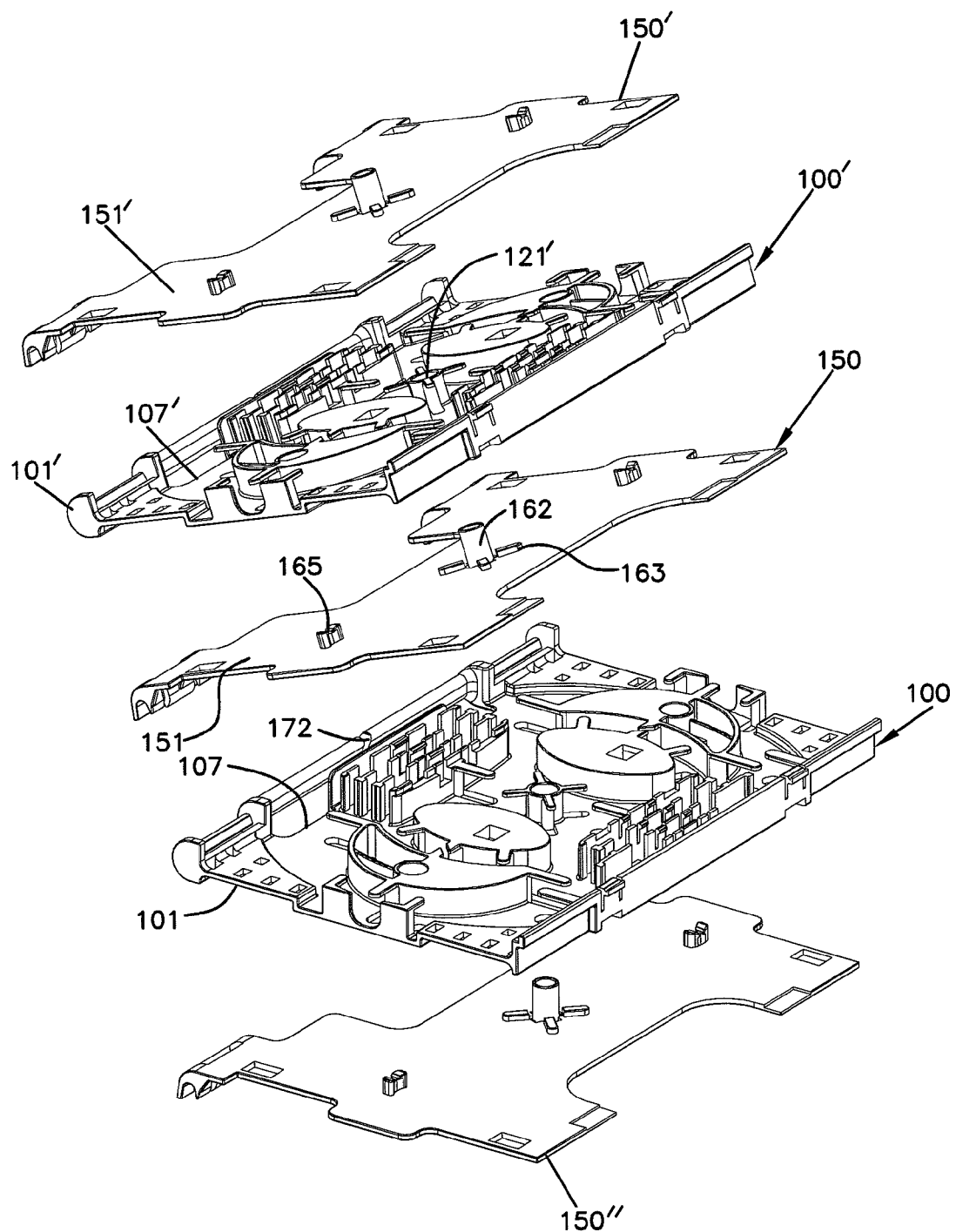
FIG. 17 is an exploded view of the tray assembly of FIGS. 15 and 16 configured in accordance with the principles of the present disclosure.

In some embodiments, the splice trays 100, 100' are coupled together in a stacked arrangement 200 in which each tray 100' is arranged on top of the cover 150 of the preceding tray 100 (e.g., see FIG. 17). In one embodiment, the splice trays 100, 100' are coupled together in a pivoting stacked arrangement that facilitates access to individual splice trays 100, 100' within the stack 200 (e.g., see FIG. 18). In other embodiments, the splice trays 100, 100' can be coupled together in any suitable arrangement that enables a user to access a selected splice tray within the tray arrangement 200.

In some embodiments, a second splice tray 100' securely couples to the cover 150 of the first splice tray 100 via an attachment assembly 160. The interior of the first splice tray 100 can be accessed by pivoting the cover 150 away from the first splice tray 100 along the hinge axis $A_p$. Pivoting the cover 150 lifts the second splice tray 100' away from the first splice tray 100 (e.g., see FIG. 20). Accordingly, pivoting the second splice tray 100' away from the first splice tray 100 is implemented by pivoting mounting receptacles 152 of the cover 150 of the first splice tray 100 about the hinge pins 144 of the first splice tray 100.

Figure 20:
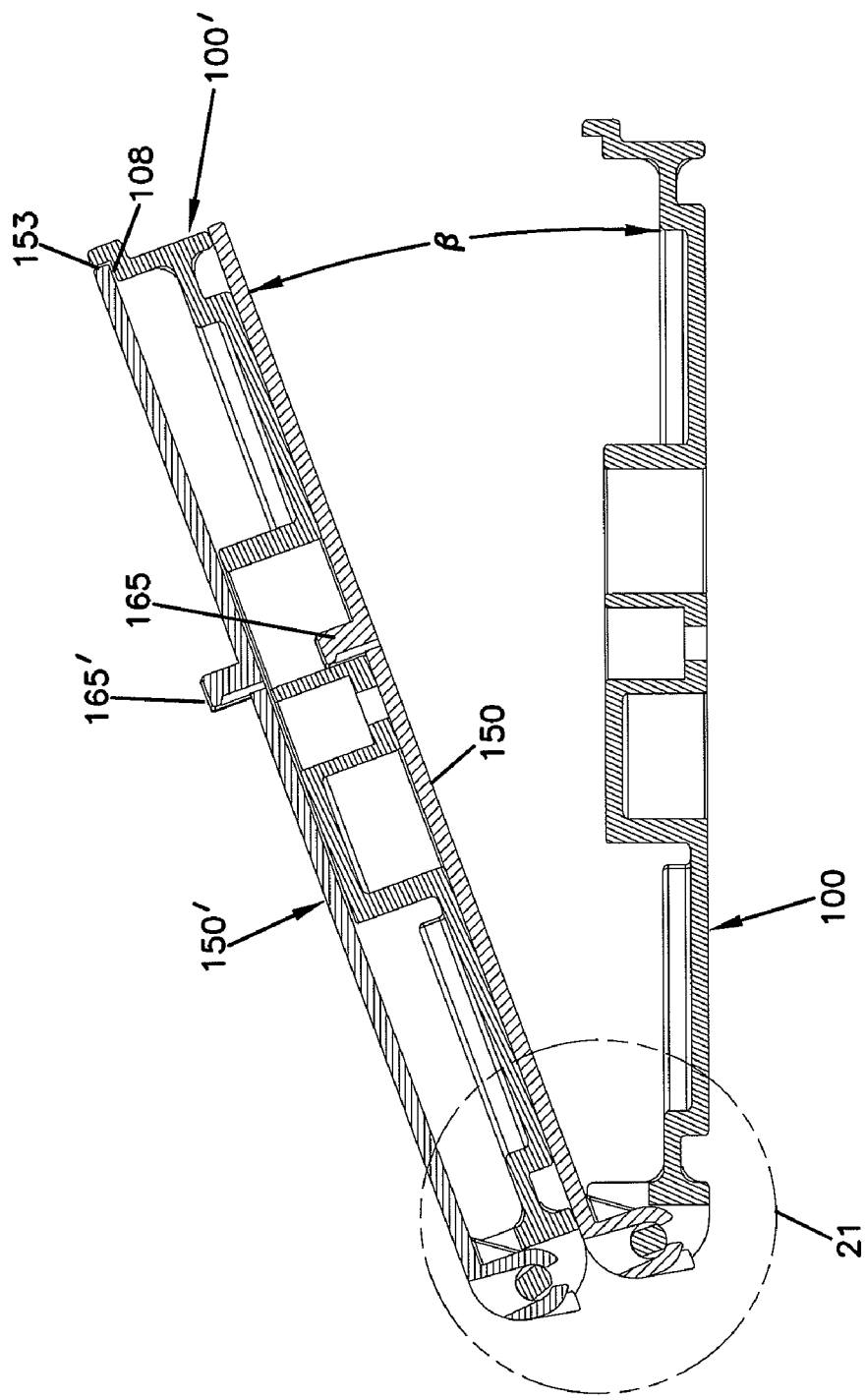
FIG. 20 is a cross-sectional view of the tray assembly of FIG. 15 taken along the 20-20 line of FIG. 19 in accordance with the principles of the present disclosure.
Figure 21:
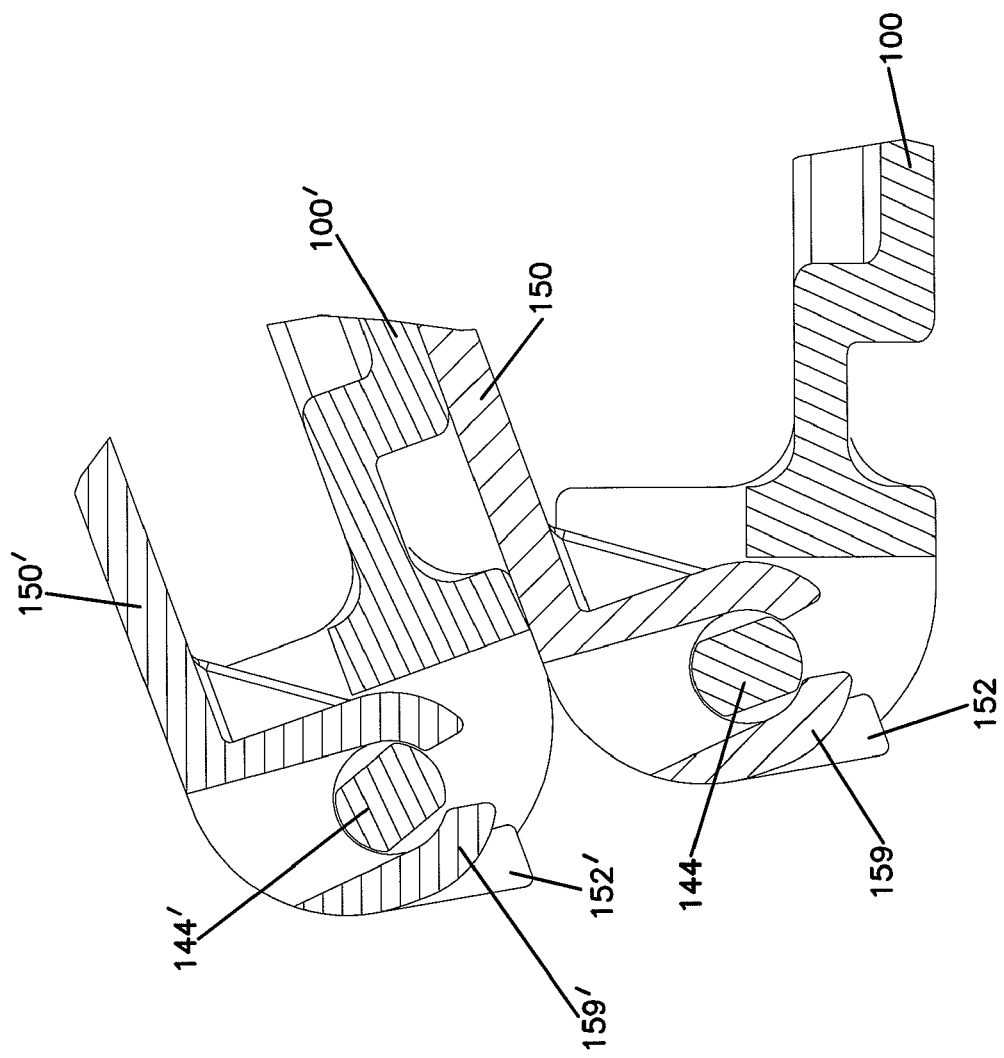
FIG. 21 is a partial view of the tray assembly of FIG. 15 defined by the circle 21 of FIG. 20, the partial view of the tray assembly showing a cross-section of the pivoting mechanism between the covers and trays of the tray assembly in accordance with the principles of the present disclosure.

Therefore, a single pivoting mechanism (e.g., the mounting receptacles 152 mounted about the hinge pins 144 shown in FIG. 21) that is arranged entirely on the first splice tray 100 can provide pivotal coupling both between a first splice tray 100 and a corresponding cover 150 and between the first splice tray 100 and additional splice trays 100' (e.g., see FIG. 20). Also, because the second splice tray 100' is securely coupled to the cover 150 of the first splice tray 100, the second splice tray 100' can be arranged relative to the first splice tray 100 at the same predetermined angle β (FIG. 20) as the cover 150. In one embodiment, the second splice tray 100' can be arranged at an angle β of about 90° with respect to the first splice tray 100.

The second splice tray 100' can be removed from the first splice tray 100 by removing the cover 150 to which the second splice tray 100' is coupled from the first splice tray 100. For example, the cover 150 of the first splice tray 100 can be oriented to enable fingers 159 of the cover 150 to cam over a rounded side of the hinge pin 144 and then slide along and off flat sides of the hinge pin 144 (e.g., see orientation of the cover 150 relative to the first splice tray 100 in FIG. 21).

In the example shown, the attachment assembly 160 includes a protrusion 162 extending upwardly from a top of the cover 150 (see FIG. 17). The protrusion 160 is generally configured to fit within a hollow interior 121' of the central fiber management structure 122' of the additional splice tray 100' (e.g., see FIG. 22). Each additional splice trays 100' can be added in this manner to the cover 150 of the previous splice tray 100 to form a stacked assembly of splice trays. In other embodiments, other types of trays (e.g., splitter trays, cable storage trays, etc.) can include covers and be coupled to the splice tray 100 in this manner.

In one embodiment, the protrusion 162 may define a hollow interior 161 (FIG. 23) to enable fastening of the cover 150, splice tray 100, and optionally a tray assembly 200 to a wall or other surface. For example, the hollow protrusion 162 of the first cover 150 shown in FIG. 22 extends within the channel interior 121' of the central fiber management structure 122' of a second splice tray 100'. A screw or other fastener (not shown) may be inserted through the hollow interior 161 of the protrusion 162 and through the channel 121' defined in the fiber spool 122' to secure the splice trays 100, 100' to a surface.

Figure 22:
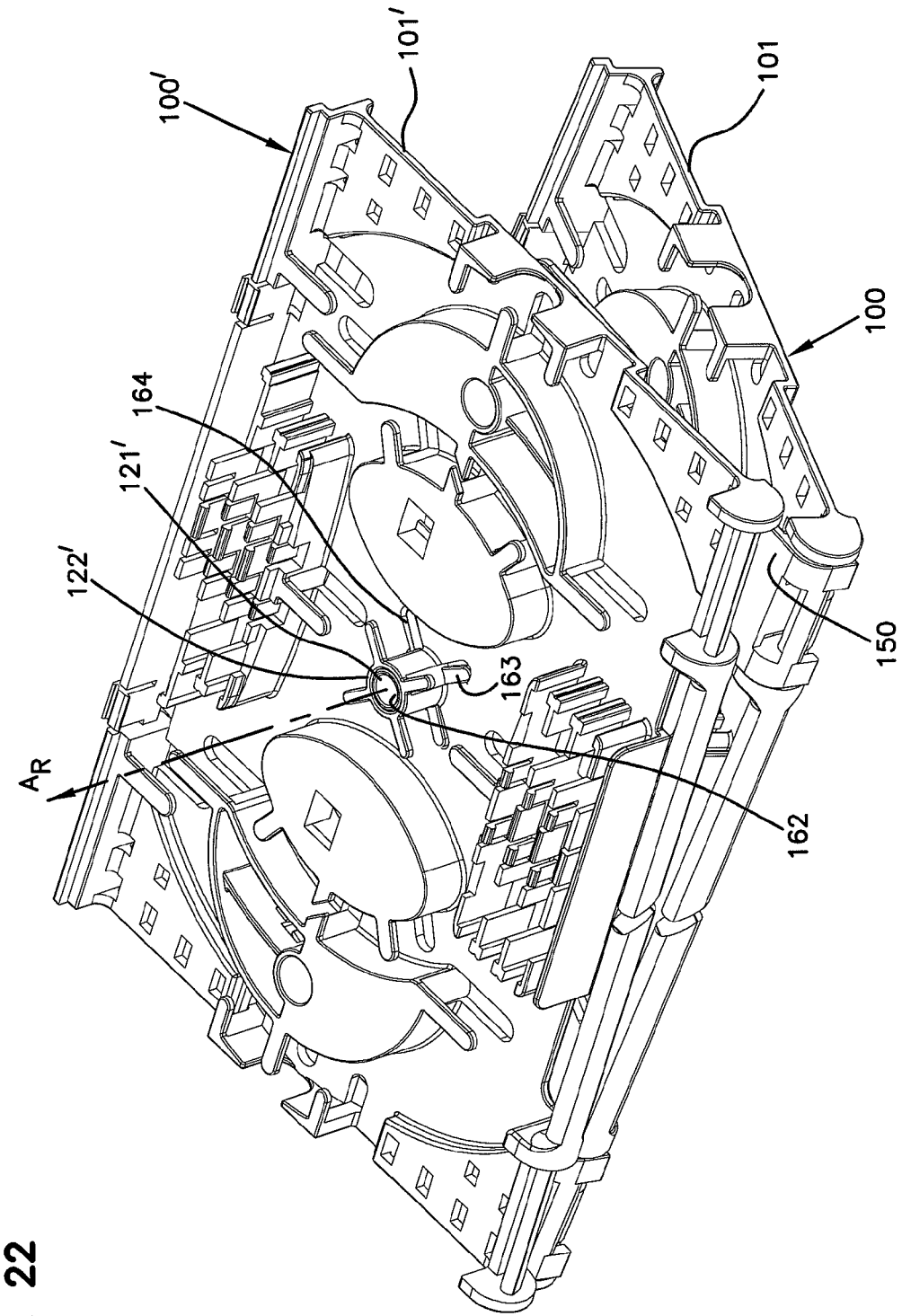
FIG. 22 is a top, rear perspective view of a top splice tray being mounted onto a cover of a bottom splice tray in accordance with the principles of the present disclosure.

In one embodiment, the attachment assembly 160 also includes openings 164' defined in the bottom panel 102' of the second splice tray 100' to accommodate alignment protrusions 163 defined by the cover 150 of the first splice tray 100 to which the additional splice tray 100' is coupled (e.g., see FIG. 22). Such accommodation of the alignment protrusions 163 of the first splice tray 100 within the openings 164' defined by the second splice tray 100' inhibits rotational movement of the second splice tray 100' relative to the first splice tray 100. In the example shown, the splice tray covers 150, 150' define four equally-spaced alignment protrusions 163, 163'. In other embodiments, however, the covers 150, 150' may provide greater or fewer alignment protrusions 163, 163'.

Figure 7:
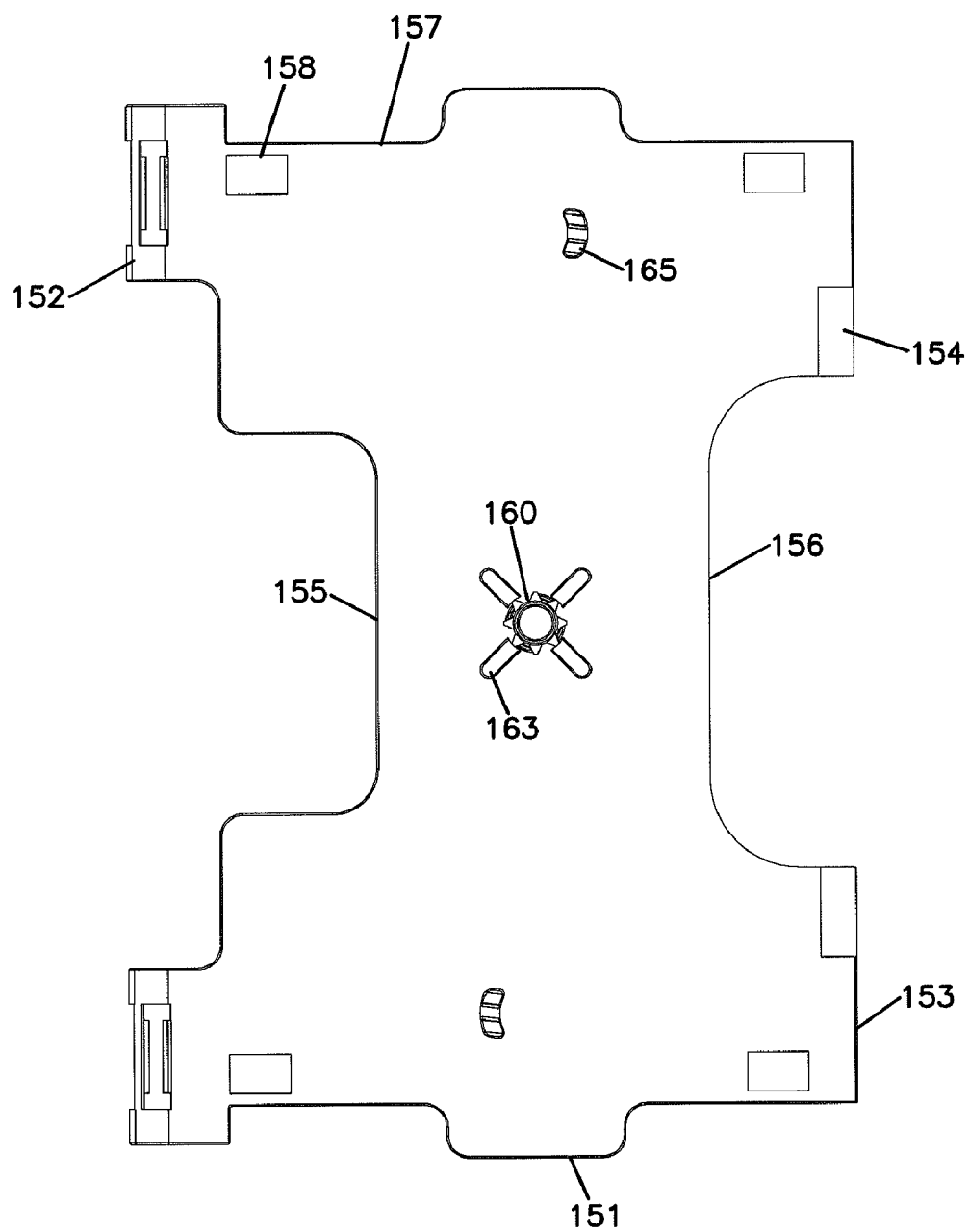
FIG. 7 is a plan view of the cover of FIG. 6 in accordance with the principles of the present disclosure.

In another embodiment, the alignment protrusions 163 define detents in the bottom surface of the cover 150 to accommodate tabs 127 extending outwardly from the central fiber management structure 122 of the first splice tray 100 (e.g., see FIGS. 4 and 7). As noted above, the example embodiment shown in FIG. 12 includes a cover 150 defining four equally-spaced alignment protrusions 163. In other embodiments, however, the cover 150 may provide greater or fewer hollow alignment protrusions 163 based on the configuration of the central fiber spool 122 of the first splice tray 100. In still other embodiments, however, the inner surface of the cover is substantially flat. In such embodiments, the tabs 127 of the fiber spool 122 terminate at the inner surface of the cover 150. Accordingly, the configuration of the alignment protrusions 163 need not match the configuration of the tabs 127.

In some embodiments, the attachment assembly 160 also includes a receiving member 165 (FIG. 13) protruding from the cover 150 of the first splice tray 100 to couple to an attachment member 166' (FIGS. 23 and 24) arranged adjacent a bottom surface of the second splice tray 100'. In one embodiment, the receiving member 165 releasably couples to the attachment member 166'. In the example shown in FIGS. 22-25, the receiving member 165 of the first splice tray 100 snap-fits onto the attachment member 166' of the second splice tray 100'. In other embodiments, however, the attachment member 166' of the second splice tray 100' can couple to the receiving member 165 of the first splice tray 100 in any suitable fashion.

Figure 10:
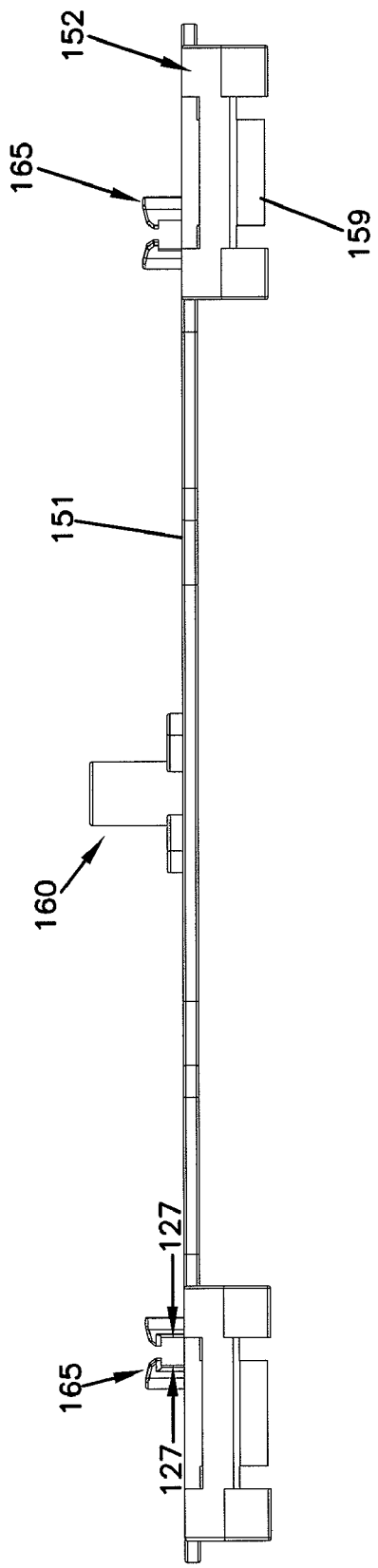
FIG. 10 is a rear view of the cover of FIG. 6 in accordance with the principles of the present disclosure.
Figure 11:
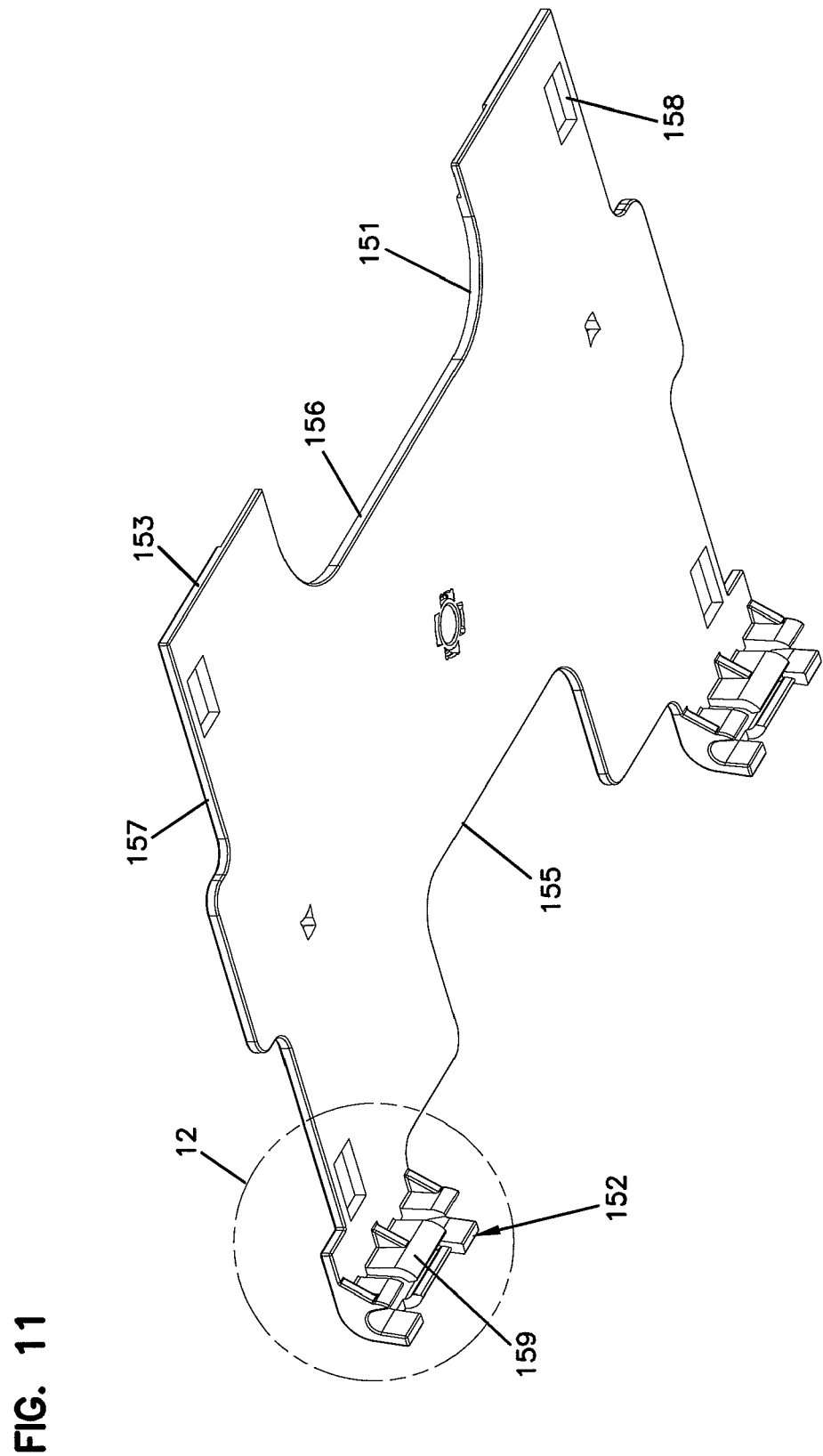
FIG. 11 is a bottom, front perspective view of the cover of FIG. 6 in accordance with the principles of the present disclosure.
Figure 12:
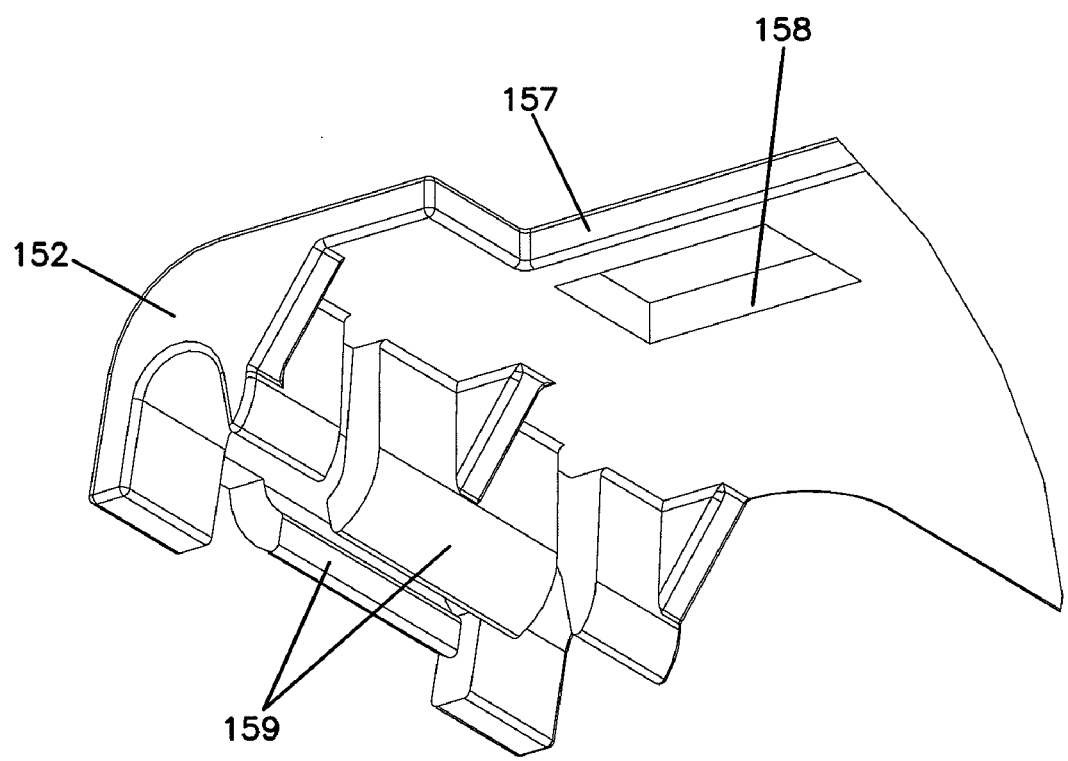
FIG. 12 is a partial view of a coupling assembly taken from the cover shown in FIG. 6 as defined by the circle 12 of FIG. 11 in accordance with the principles of the present disclosure.
Figure 24:
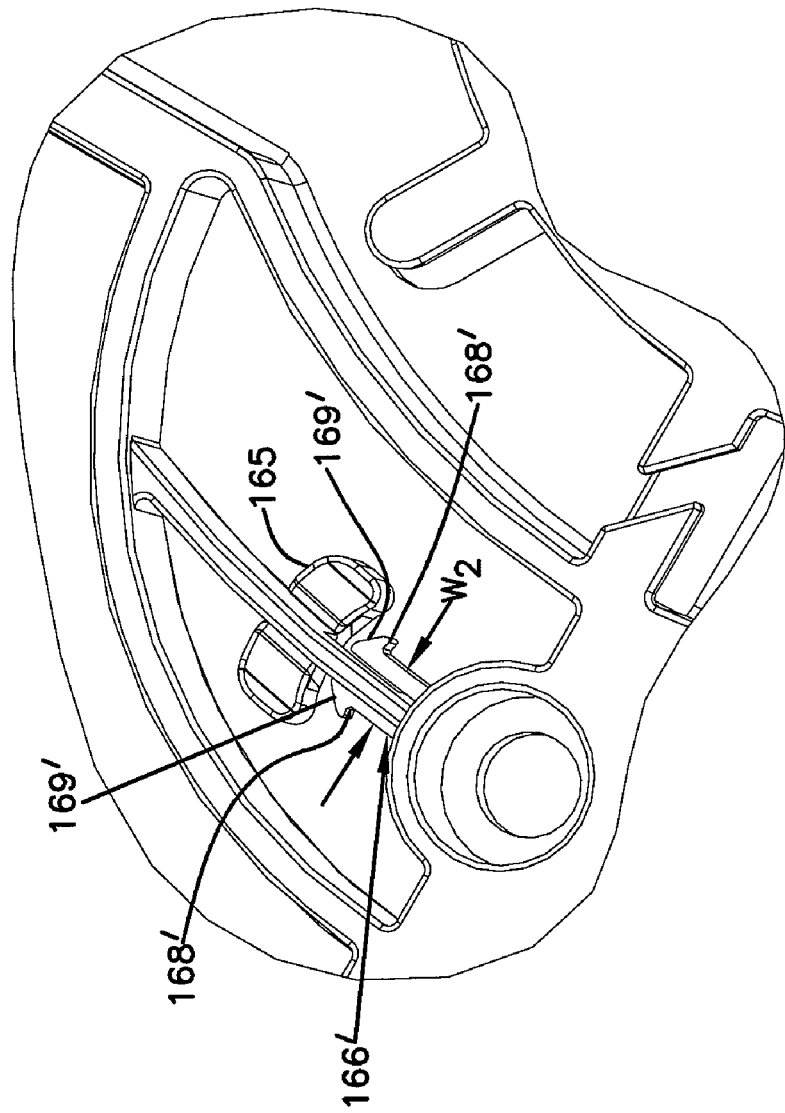
FIG. 24 is a partial view of the top splice tray of FIG. 22 as defined by the circle 24 of FIG. 23, the partial view of the top splice tray showing an attachment member of the top splice tray aligned with a receiving member of the cover of the bottom splice tray in accordance with the principles of the present disclosure.
Figure 25:
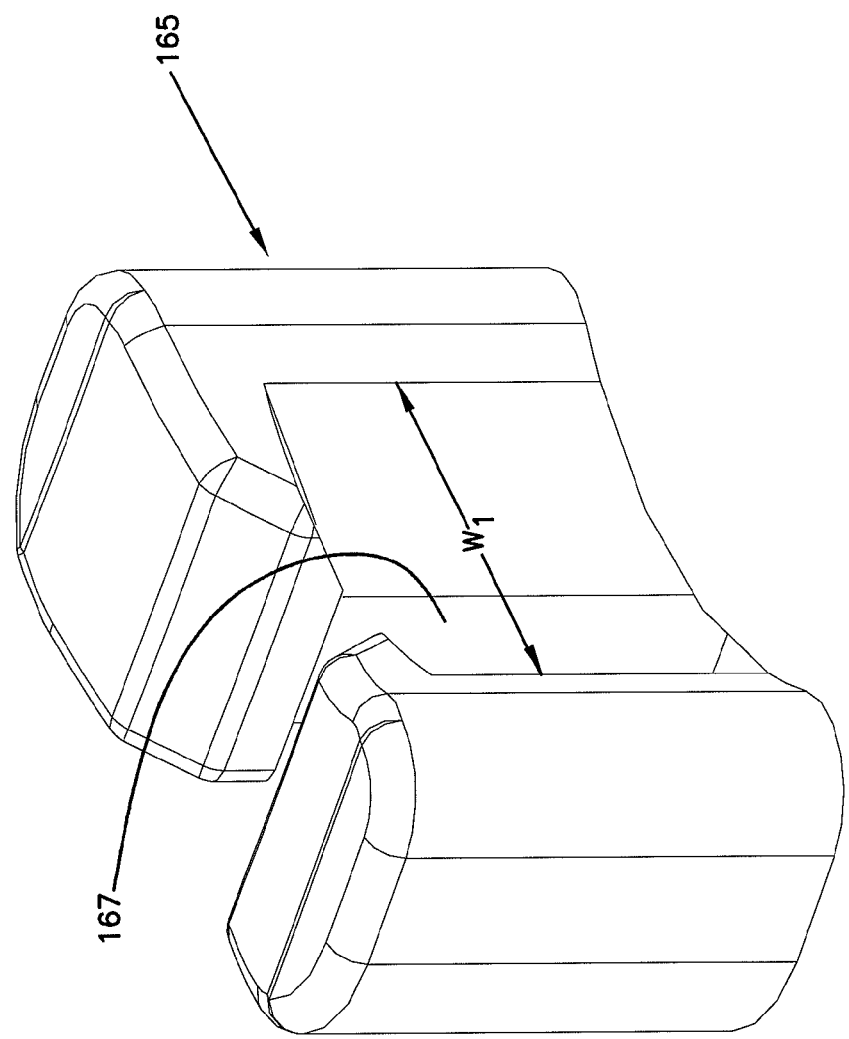
FIG. 25 is a partial view of an example receiving member protruding from a splice tray cover in accordance with the principles of the present disclosure.

In one embodiment, the receiving member 165 includes two spaced, opposing tabs protruding upwardly from the cover 150 (e.g., see FIG. 10). The receiving member 165 defines a channel 167 extending between the two tabs (FIG. 25). The channel 167 has a width $W_1$ (FIG. 25). The attachment member 166' has a width $W_2$ extending across two opposing, flexible tabs 168' (FIG. 24). The width $W_2$ of the attachment member 166' is less than or equal to the width $W_1$ of the channel 167. Each of the flexible tabs 168' has a latching end 169' (FIG. 24).

In general, the flexible tabs 168' of the attachment member 166' compress together to fit within (e.g., slide through) the channel 167 of the receiving member 165. In one embodiment, the latching ends 169' of each flexible tab 168' includes a camming surface to facilitate biasing the tabs 168' towards each other when the tabs 168' are slid through the channel 167. The latching ends 169' of the flexible tabs 168' secure to the sides of the tabs of the receiving member 165 to secure the attachment member 166' to the receiving member 165.

Figure 23:
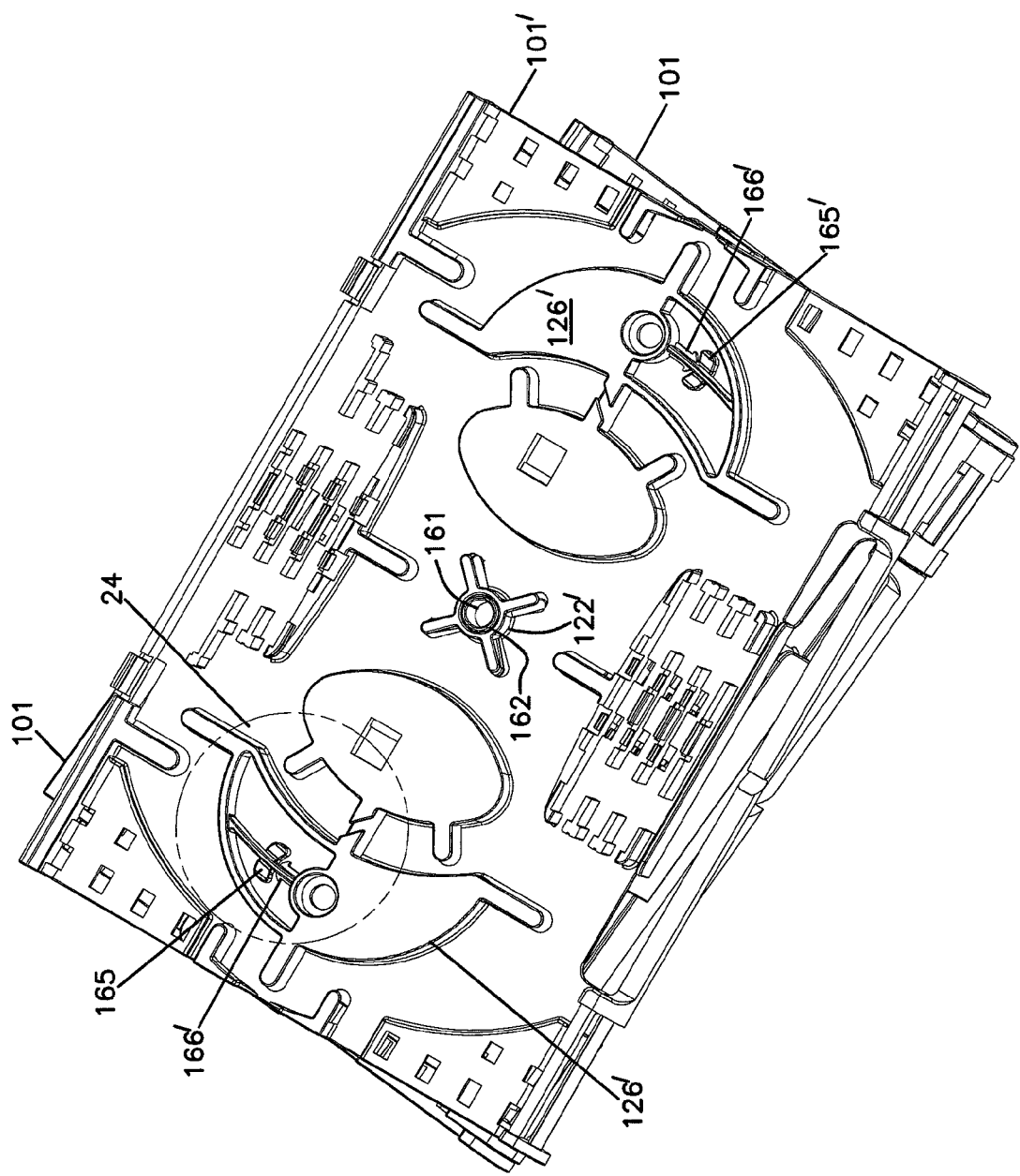
FIG. 23 is a plan view of the top and bottom splice trays of FIG. 22 in accordance with the principles of the present disclosure.

In one embodiment, a first attachment member 166' is arranged adjacent one of the outer spools 126' of the second splice tray 100' (FIG. 23). In the example shown, the first attachment member 166' is accommodated within a detent defined in one of the outer spools 126 and a second attachment member 166' is accommodated within a detent defined in the other outer spool 126. In such an embodiment, a corresponding receiving member 165 is positioned on either end of the cover 150 (e.g., see FIGS. 17 and 23). In other embodiments, however, the receiving member 165 and attachment member 166' can be provided at any suitable locations on the first and second splice trays 100, 100', respectively.

In the example shown in FIGS. 22 and 23, the second splice tray 100' has been partially mounted to the cover 150 of the first splice tray 100. The protrusion 162 of the cover 150 of the first splice tray 100 has been slid into the channel 121' defined by the central fiber spool 122' of the second splice tray 100'. However, attachment members 166' of the second splice tray 100' have not yet been coupled to the receiving members 165 of the cover 150. In addition, the second splice tray 100' shown in FIGS. 22 and 23 is rotated about a rotational axis $A_R$ with respect to the first splice tray 100.

Furthermore, the attachment members 166' of the second splice tray 100' of FIG. 23 are oriented in opposite directions. Accordingly, the attachment members 166' can be coupled to their respective receiving members 165 by twisting the second splice tray 100' with respect to the first splice tray 100 about the rotational axis $A_R$, thereby sliding the flexible tabs 168' of each of the attachment members 166' into the channels 167 of the respective receiving members 165. Once through the channels 167, the latching ends 169' of the flexible tabs 168' are free to hook to the tabs of the receiving members 165 and inhibit the flexible tabs 168' from being pulled out of the channels 167. Accordingly, the latching ends 169' inhibit rotational movement of the second splice tray 100' with respect to the first splice tray 100.

The splice trays 100, 100' in a splice tray arrangement 200 may be releasably secured to each another using a coupling arrangement. When a user elects to access a selected one of the splice trays 100, 100' in a tray arrangement 200, the user releases the coupling arrangement on the selected splice tray, pivots the corresponding cover away from the selected tray into an open position, and accesses the interior of the selected tray. In one embodiment, the coupling arrangement includes the latching tab 115 and corresponding cover notch 154 described above.

In other embodiments, however, the splice trays may be coupled together using a magnetic arrangement (now shown). The force of the magnetic attraction between the cover and the splice tray or between adjacent splice trays is sufficiently strong to inhibit relative movement of the trays until application of a predetermined force by the user. In one embodiment, the magnet arrangement can include a disc magnet. In another embodiment, the magnet arrangement can include a flat magnet. In another embodiment, the magnet arrangement can include a snap-in cylinder magnet. In another embodiment, the magnet arrangement can include multiple magnets.

In one embodiment, each splice tray of the splice tray arrangement may include one or more magnets that are attracted to one or more magnets arranged in an adjacent splice tray. For example, the magnet of each splice tray can be arranged within one or more cavities (not shown) provided within the fiber management structures 122, 124, 126, respectively, of the splice trays. In other embodiments, however, magnets may be provided in any suitable locations within the splice trays. In another embodiment, some splice trays include magnets and other splice trays include metal or metallized features fabricated to be attracted to the magnets.

Figure 26:
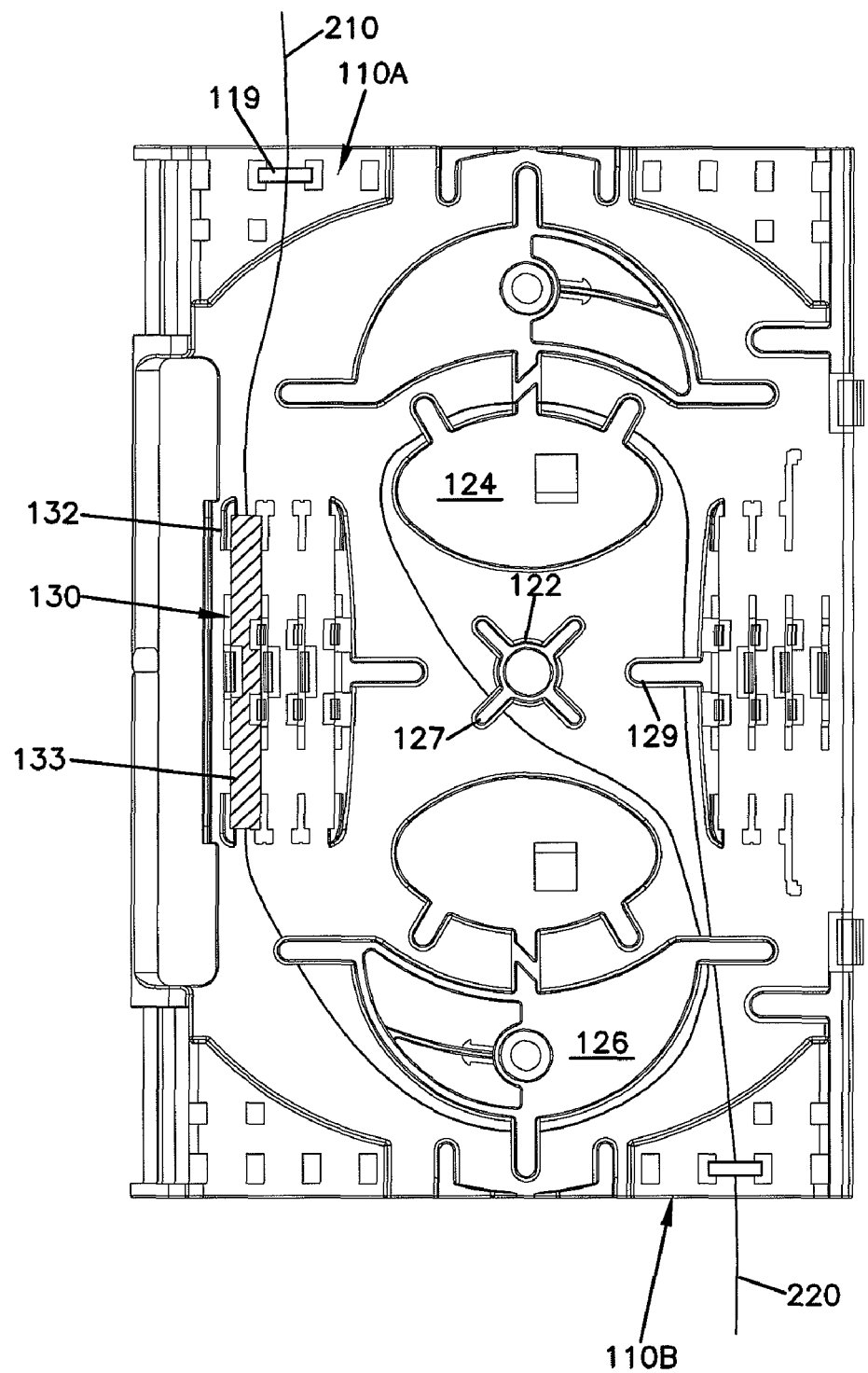
FIGS. 26 and 27 are schematic diagrams of example fiber routing layouts in accordance with the principles of the present disclosure.
Figure 27:
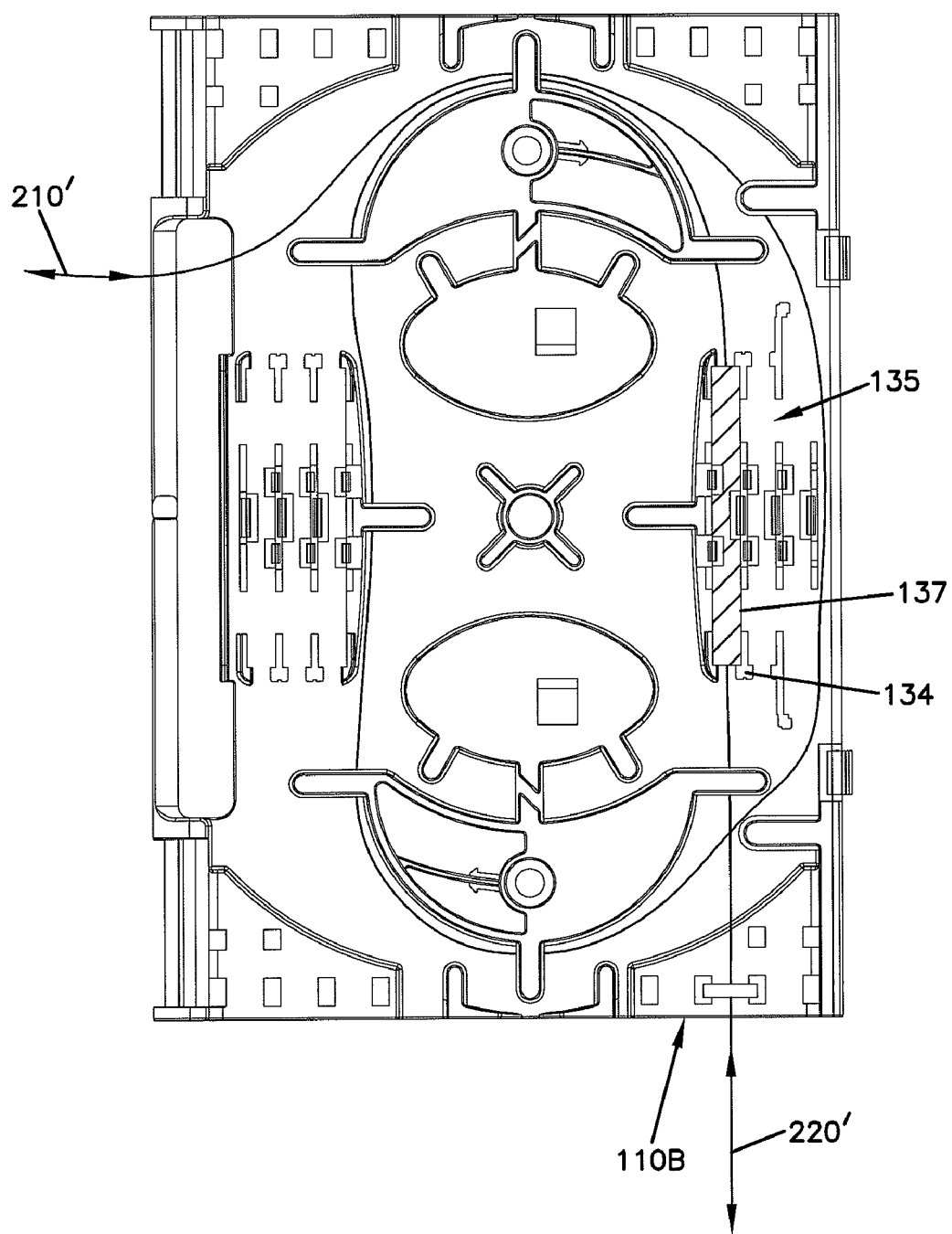

Non-limiting example of a fiber-routing layouts are provided herein with respect to FIGS. 26-27. As shown at FIG. 26, a fiber 210 from a trunk cable (not shown) enters the splice tray 100 through a first fiber input/output region 110A in a first fiber routing layout. In the example shown, a cable tie 119 secures the fiber 210 to openings 112 of the input/output region 110A. In other embodiments, the fiber 220 can enter the splice tray 100 at any of the input/output regions or through the pass-through opening 107. The fiber 210 is typically either loose or tight buffered.

Upon entering the splice tray 100, the fiber 210 shown in FIG. 26 is routed directly to the first splice region 130. In other embodiments, however, excess length of the fiber 210 can be taken up by the fiber management structures 122, 124, 126 of the cable management region 120. At the splice region 130, the fiber 210 is spliced to a fiber 220 corresponding to a drop cable. The drop cable fiber 220 is routed from a splice sleeve 133 surrounding the optical splice, around one of the half-spools 126 along the second storage path P2 (see FIG. 4), in front of the central spool 122 to reverse direction, and around one of the full spools 124 along the first storage path P1 to a second fiber input/output region 110B.

As shown at FIG. 27, a fiber 210' from another tray of a tray assembly (e.g., another splice tray, a splitter tray, a cable management tray, etc.) enters the splice tray 100 through the pass-through opening 107 in a second fiber routing layout. For example, the fiber 210' may have been threaded up through the pass-through 107 or inserted through the slot 172 defined in the surface 171 of the splice tray 100. The fiber 210' is typically either loose or tight buffered.

Upon entering the splice tray 100, excess length of the fiber 210' is wrapped around one of the half-spools 126, routed along the channel 128 of the storage path P3, and wound around both half spools 126 of the intermediate path P2. The fiber 210' is routed to a splice sleeve 137 arranged at the second splice region 135. The fiber 210' is spliced to a fiber 220' corresponding to a drop cable at the second splice region 135. The drop cable fiber 220' leaves the splice sleeve 137 and exits the fiber splice tray 100 at the input/output region 110B. As shown in FIG. 32, the fiber 220' is secured to the input/ output region 110B using a securement arrangement 119, such as a cable tie. The fiber 220' is typically loose or tight buffered.

In other embodiments, the excess length of any of the fibers may be stored within the cable management region 120 of the splice tray 100 in other configurations. For example, excess length of the fibers can be routed in a full or partial loop around the first path P1, in a full or partial loop around the second path P2, in a full or partial loop around the third path P3, in a figure-8 configuration about the full spools 124 or about the half-spools 126, or some combination thereof. In one embodiment, both fibers can enter the splice tray 100 through the pass-through opening 107. In another embodiment, the fibers can enter the splice tray 100 through the same input/output region 110.

The above specification provides examples of how certain aspects may be put into practice. It will be appreciated that the aspects can be practiced in other ways than those specifically shown and described herein without departing from the spirit and scope of the disclosure.

What is claimed is:

1. A splice tray arrangement comprising:
    a first splice tray defining an interior in which a fiber splice region is arranged, the first splice tray also including at least one hinge pin defining a pivot axis;
    a first cover including at least one mounting receptacle by which the first cover can be pivotally mounted to the hinge pin of first splice tray, the first cover being configured to pivot about the pivot axis between open and closed positions;
    a second splice tray defining an interior in which a fiber splice region is arranged; and
    an attachment assembly configured to secure the second splice tray to the first cover, wherein pivoting the first cover from the closed position to the open position pivots the second splice tray away from the first splice tray and wherein pivoting the first cover from the open position to the closed position pivots the second splice tray toward the first splice tray.

2. The splice tray arrangement of claim 1, wherein the first splice tray also includes a fiber input/output region; and a fiber management region.

3. The splice tray arrangement of claim 1, wherein the attachment assembly includes a first protrusion extending from an exterior surface of the first cover and a hollow second protrusion extending into the interior of the second splice tray, wherein the first protrusion fits within the second protrusion.

4. The splice tray arrangement of claim 3, wherein the hollow second protrusion includes a cable spool arranged within a cable management region within the interior of the second splice tray.

5. The splice tray arrangement of claim 3, wherein the attachment assembly further includes at least a first latching assembly by which the second splice tray may be securely coupled to the first cover, the latching assembly inhibiting rotational movement of the second splice tray with respect to the cover.

6. The splice tray arrangement of claim 5, wherein the first latching assembly includes a set of receiving tabs extending upwardly from the first cover to form a channel and a set of flexible tabs coupled to the second splice tray, the set of flexible tabs being configured to fit within the channel formed by the set of receiving tabs.

7. The splice tray arrangement of claim 6, wherein each of the flexible tabs includes a latching end configured to latch to the receiving tabs to secure the second splice tray to the first cover.

8. The splice tray arrangement of claim 6, wherein the flexible tabs extend generally perpendicular to the receiving tabs.

9. The splice tray arrangement of claim 5, wherein the attachment assembly further includes a second latching assembly oriented in an opposite direction from the first latching assembly, the first and second latching assemblies being arranged on opposite ends of the first cover.

10. The splice tray arrangement of claim 3, wherein the first cover includes at least one alignment protrusion extending from the exterior surface of the first cover and wherein the second splice tray defines at least one opening configured to receive the alignment protrusion.

11. The splice tray arrangement of claim 10, wherein the first cover includes four alignment protrusions and the second splice tray defines four openings.

12. The splice tray arrangement of claim 1, further comprising:
    a plurality of splice trays, each splice tray defining an interior in which a fiber splice region is arranged, the first splice tray also including at least one hinge pin defining a pivot axis;
    a plurality of covers, each cover including at least one mounting receptacle by which the cover can be pivotally mounted to the respective hinge pin of one of the splice trays, each cover being configured to pivot between open and closed positions about the pivot axis of the splice tray to which the cover is mounted; and
    a plurality of attachment assemblies configured to secure each of the splice trays to the cover of another of the splice trays;
    wherein pivoting one of the covers from the closed position to the open position pivots the splice tray coupled to the cover away from the splice tray to which the cover is mounted, and wherein pivoting the cover from the open position to the closed position pivots the splice tray coupled to the cover toward the splice tray to which the cover is mounted.

13. The splice tray arrangement of claim 12, wherein pivoting one of the covers from the closed position to the open position also pivots any splice trays that are coupled to the splice tray that is coupled to the cover away from the splice tray to which the cover is mounted.

14. The splice tray arrangement of claim 1, wherein the splice region of the first splice tray is configured to retain an optical splice between a first fiber and a second fiber, wherein a fiber management structure is arranged within the interior of the first splice tray and is configured to receive excess fiber length of the first and second fibers.

15. The splice tray arrangement of claim 1, wherein the first cover is removably mounted to the first splice tray.

16. The splice tray arrangement of claim 15, wherein the hinge pin of the first splice tray includes opposing flat sides and opposing rounded sides, and wherein the mounting receptacle of the first cover includes fingers configured to slide along the flat sides of the hinge pin and to snap around one of the rounded sides.

17. The splice tray arrangement of claim 15, wherein the second splice tray is configured to be separated from the first splice tray after being secured to the first cover by removing the first cover from the first splice tray.

* * * * *